United States Patent [19]

Kiyonaga et al.

[11] Patent Number: 5,652,767
[45] Date of Patent: Jul. 29, 1997

[54] DATA DECISION CIRCUIT USED IN OPTICAL PARALLEL RECEIVING MODULE, OPTICAL PARALLEL RECEIVING MODULE, OPTICAL PARALLEL TRANSMISSION SYSTEM AND TERMINAL STRUCTURE OF OPTICAL TRANSMISSION FIBER

[75] Inventors: Tetsuya Kiyonaga; Tetsuo Watanabe; Tatsuro Kunikane, all of Kawasaki; Hiroyuki Furukawa, Sapporo; Yoshimitsu Sakai, Kawasaki; Sadayuki Miyata, Kawasaki; Takeo Iwama, Kawasaki, all of Japan

[73] Assignee: Fujitsu Limited, Kanagawa, Japan

[21] Appl. No.: 406,321

[22] Filed: Mar. 17, 1995

[30] Foreign Application Priority Data

Mar. 18, 1994 [JP] Japan ................................. 6-049495
Feb. 13, 1995 [JP] Japan ................................. 7-024395

[51] Int. Cl.$^6$ .................. H03D 1/00; H04L 7/02; H04L 25/08; G08C 19/36
[52] U.S. Cl. .................. 375/317; 375/342; 375/349; 375/360; 359/163; 359/189; 327/144
[58] Field of Search .................. 375/317, 359, 375/360, 357, 354, 371, 362; 395/550; 327/141, 144, 145, 99; 326/93, 96; 331/49; 370/105.3; 359/163, 189, 158, 110

[56] References Cited

U.S. PATENT DOCUMENTS 4,328,543  5/1982  Brickman et al. .......................... 395/310
4,620,294 10/1986  Leung et al. ............................... 375/222
5,146,473  9/1992  Critchlow et al. .......................... 375/222
5,245,637  9/1993  Gersbach et al. ........................... 375/373
5,408,614  4/1995  Thornton et al. ........................... 395/841
5,444,704  8/1995  Henderson et al. ......................... 370/84
5,450,530  9/1995  Snyder et al. .............................. 375/220

*Primary Examiner*—Wellington Chin
*Assistant Examiner*—William Luther
*Attorney, Agent, or Firm*—Helfgott & Karas, P.C.

[57] ABSTRACT

An optical parallel receiving module receives optical signals transmitted in parallel in a plurality of channels by using optical fibers. The optical parallel receiving module includes photo-electric conversion elements for converting received signals which are electric signals as received signals, limiter amplifiers for comparing the received signals and a threshold level, and data decision circuits for recognizing data at a timing in every period of received data using a reference clock. Each of the data decision circuits includes a data edge position detecting unit for detecting in which region of a plurality of regions a rising edge of the received data is and for outputting a detecting signal corresponding to a detected region, one period of the received data having a reference phase equal to a phase of the reference clock signal being divided into the plurality of regions; and a data acquisition unit to which a plurality of clocks having different phases and the detecting signal from the data edge position detecting unit are supplied, each of the plurality of clocks corresponding to one of the plurality of regions, for acquiring data at a timing of a clock corresponding to the region in which the rising edge of the received data is detected by the data edge position detecting unit.

21 Claims, 36 Drawing Sheets

FIG. 2A
PRIOR ART
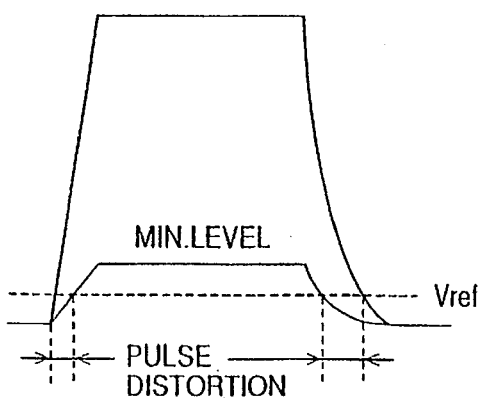
FIG. 2B
PRIOR ART
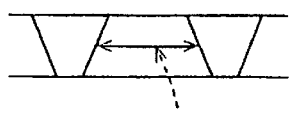
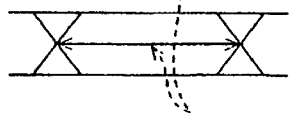
FIG. 3A
PRIOR ART
FIG. 3B
PRIOR ART
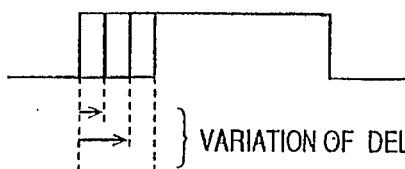
FIG. 3C
PRIOR ART
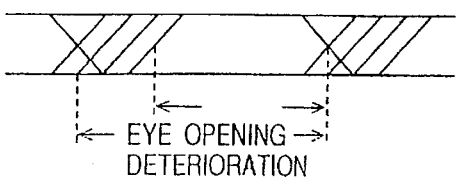

FIG. 4A
PRIOR ART
ADVANCED DATA
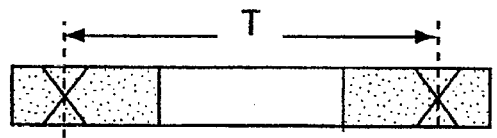
FIG. 4B
PRIOR ART
SAME PHASE DATA
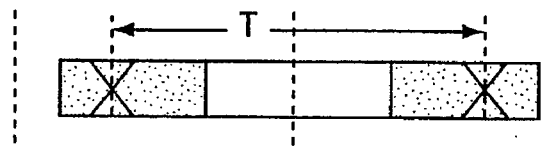
FIG. 4C
PRIOR ART
DELAYED DATA
FIG. 4D
PRIOR ART
CLK
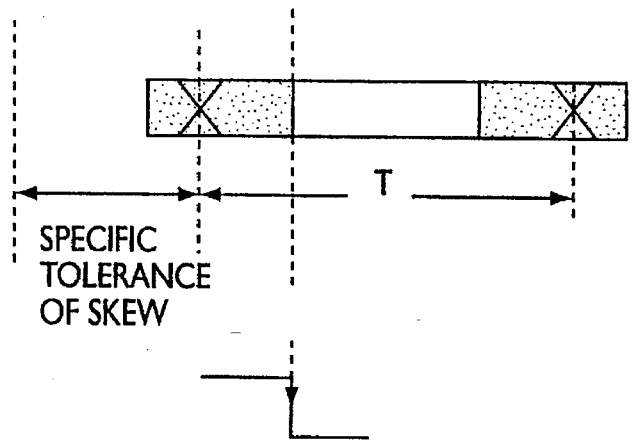
FIG. 5
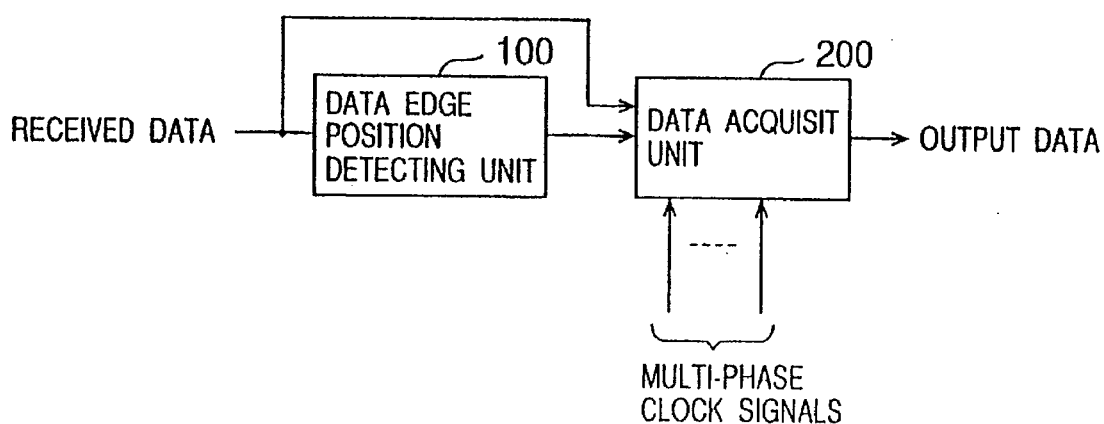

| | S1 | S2 | Q |
|---|---|---|---|
| Z4 | L | L | D4 |
| Z3 | L | H | D3 |
| Z1 | H | L | D1 |
| Z2 | H | H | D2 |

FIG. 9A RECEIVED DATA

FIG. 9B CLK (CS3)

FIG. 9C CLKB (CS4)

FIG. 10A PHASE 1
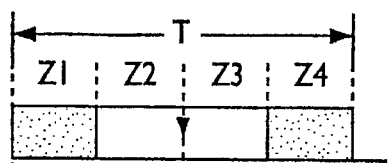
FIG. 10B PHASE 2
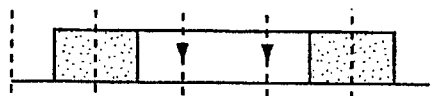
FIG. 10C PHASE 3
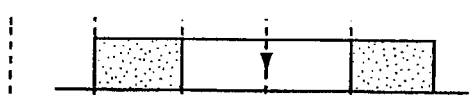
FIG. 10D PHASE 4
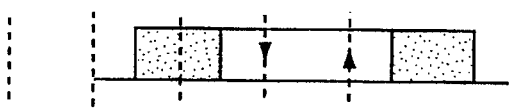
FIG. 10E PHASE 5
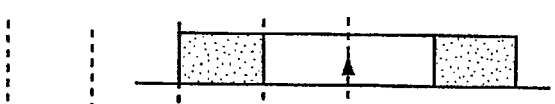
FIG. 10F PHASE 6
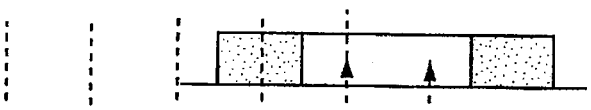
FIG. 10G PHASE 7
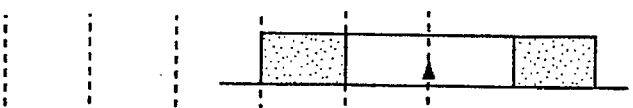
FIG. 10H PHASE 8
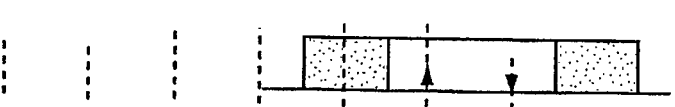
FIG. 10I PHASE 1
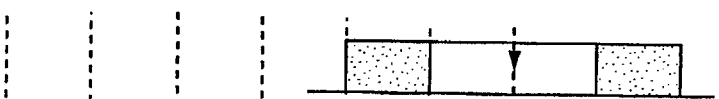
FIG. 10J CLK
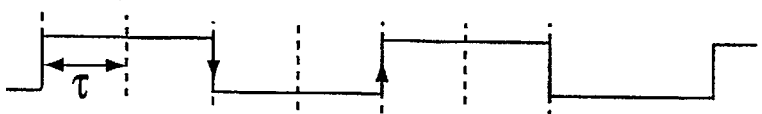
FIG. 10K CLKB
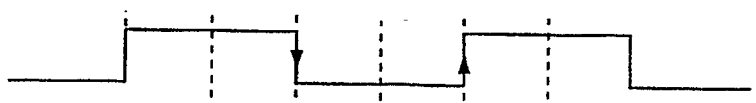

FIG. 11A PHASE 1 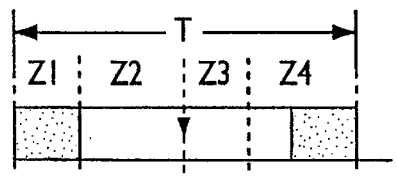
FIG. 11B PHASE 2 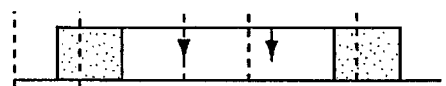
FIG. 11C PHASE 3 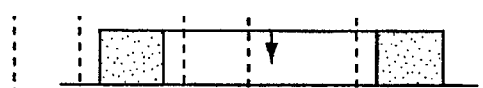
FIG. 11D PHASE 4 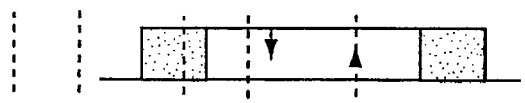
FIG. 11E PHASE 5 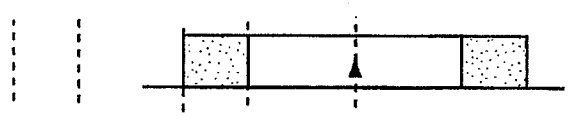
FIG. 11F PHASE 6 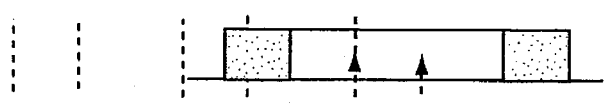
FIG. 11G PHASE 7 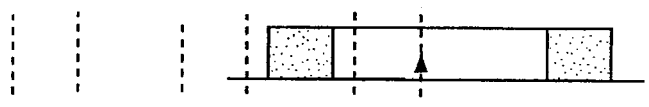
FIG. 11H PHASE 8 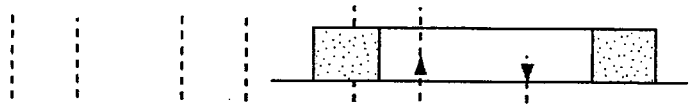
FIG. 11I PHASE 1 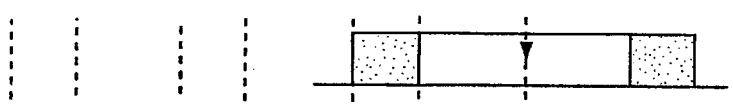
FIG. 11J CLK 
FIG. 11K CLKB 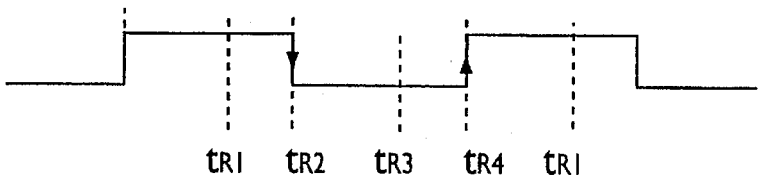

FIG. 12A-A RECEIVED DATA 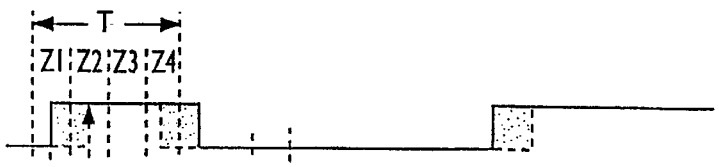
FIG. 12A-B CLK 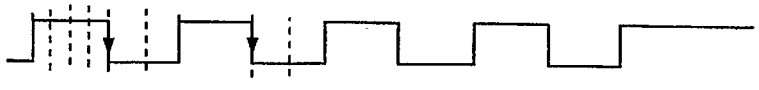
FIG. 12A-C CLKB 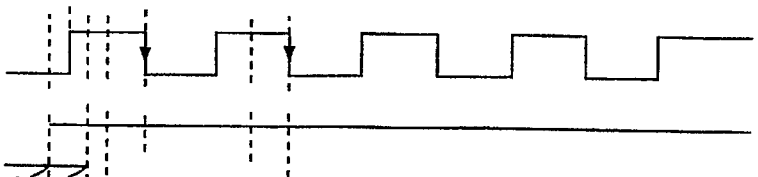
FIG. 12A-D SI 
FIG. 12A-E S2 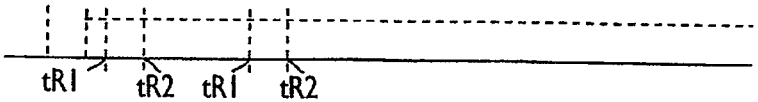
FIG. 12A-F Q 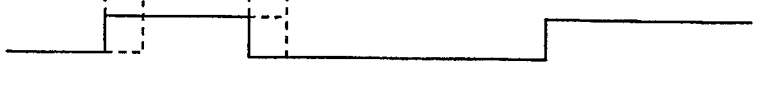
FIG. 12B-A RECEIVED DATA 
FIG. 12B-B CLK 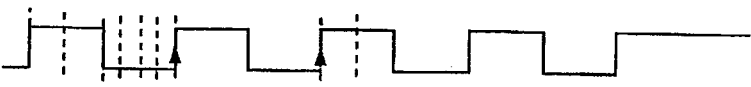
FIG. 12B-C CLKB 
FIG. 12B-D SI 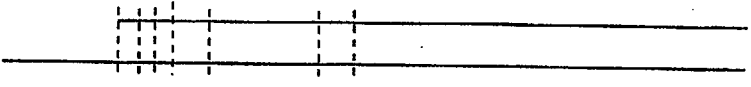
FIG. 12B-E S2 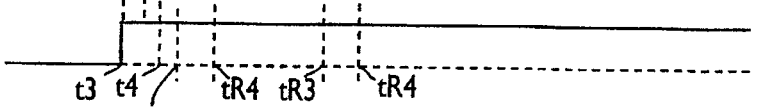
FIG. 12B-F Q 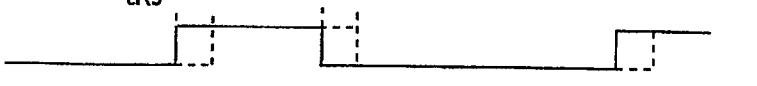

DATA DECISION CIRCUIT USED IN OPTICAL PARALLEL RECEIVING MODULE, OPTICAL PARALLEL RECEIVING MODULE, OPTICAL PARALLEL TRANSMISSION SYSTEM AND TERMINAL STRUCTURE OF OPTICAL TRANSMISSION FIBER

TITLE OF THE INVENTION

DATA DECISION CIRCUIT USED IN OPTICAL PARALLEL RECEIVING MODULE, OPTICAL PARALLEL RECEIVING MODULE, OPTICAL PARALLEL TRANSMISSION SYSTEM AND TERMINAL STRUCTURE OF OPTICAL TRANSMISSION FIBER

BACKGROUND OF THE INVENTION (1) Field of the Invention

The present invention generally relates to a data decision circuit used in an optical parallel receiving module, an optical parallel receiving module, an optical parallel transmission system and a terminal structure of an optical transmission fiber. In particular, the present invention relates to an optical parallel receiving module, a data decision circuit and a terminal structure of an optical transmission fiber which are used in an optical parallel transmission system substitutable for a system using a coaxial cable.

An optical parallel transmission system is superior to a system using a coaxial cable through which electric signals pass in several characteristics: a transmission speed; a transmission distance; a cross talk between transmission path channels; and the like. Therefore, the optical parallel transmission system is expected as an ATM (Asynchronous Transport Mode) equipment, wiring between/in units in a communication equipment, a high-speed interface between computers or the like.

In the optical parallel transmission system expected to be substitutive for a system using the coaxial cable, it is desired that an allowable skew range between channels be expanded.

(2) Description of the related Art

Since the optical parallel transmission system is miniaturized, the structure thereof is simpler than that of an optical transmission system in a trunk line. The optical parallel transmission system in which the structure is simplified is disclosed, for example, in Japanese Laid Open Paten Application No.5-7182.

FIG. 1 shows an example of a conventional optical parallel transmission system 30 which is simplified as a substitution for a system using the coaxial cable. Referring to FIG. 1, the optical parallel transmission system 30 has a transmission link 12, an array fiber 16 and a receiving link 31. The transmission link 12 converts n-channel data supplied as electric signals and a clock signal CLK into data of optical signals and outputs them. The optical signals output from the transmission link 12 is transmitted through the array fiber 16. The receiving link 31 receives the optical signals from the array fiber 16, converts the optical signals into electric signals and generates n-channel output data and the clock signal.

The transmission link 12 has laser diode driver circuits $13_1$–$13_n$ and laser diodes $14_1$–$14_n$ which correspond to the n-channel data DATA 1–DATA n. The transmission link 12 further has, for a clock signal CLK, a laser diode driver circuit $13_{n+1}$ and a laser diode $14_{n+1}$. The receiving link 31 has photo-diodes $22_1$–$22_{n+1}$, pre-amplifiers $23_1$–$23_{n+1}$ and limiter amplifiers $24_1$–$24_{n+1}$ which corresponds to the received n-channel data and the clock signal. The receiver link 31 further has data decision circuits $32_1$–$32_n$ corresponding to the n-channel data and a reference circuit 25 supplying a threshold voltage to the data decision circuits. Optical connectors are used to connect the laser diodes $14_1$–$14_{n+1}$ to the array fiber 16 and to connect the array fiber 16 to the photo-diodes $22_1$–$22_{n+1}$.

For the sake of miniaturizing, various functions provided in an optical transmission system in a main line are omitted from the optical parallel transmission system. An APC function for stabilizing an optical output is omitted from the transmission link 12. Functions, such as an AGC function and re-timing function, are omitted from the receiving link 31. Since the re-timing function is omitted from the receiving link 31, the clock sinal CLK is transmitted through a line other than lines for data. In addition, a fixed threshold method is used for the system so that burst signals can be processed and the structure can be simplified.

In order to miniaturize the system, elements are integrated. For example, the laser diode driver circuits $13_1$–$13_{n+1}$ are is integrated, and the laser diodes $14_1$–$14_{n+1}$ are formed in a laser diode array. In addition, in the receiving link 31, the photo-diodes $22_1$–$22_{n+1}$ are formed in a photo-diode array, and the pre-amplifiers $23_1$–$23_{n+1}$ and the limiter amplifiers $24_1$–$24_{n+1}$ are monolithicaly. Also the data decision circuits $32_1$–$32_n$ are monolithicaly.

Optical fibers integrated in an array fiber 16 is used to transmit signals. In addition, an array-shaped optical connector is used.

A description will now be given of an operation of the optical parallel transmission system.

The laser diode driver circuits $13_1$–$13_{n+1}$ respectively supply to the laser diodes $14_1$–$14_{n+1}$ driving signals corresponding to the transmission data DATA1–DATAn and the clock signal CLK. The respective laser diodes $14_1$–$14_{n+1}$ generate optical signals corresponding to the driving signals supplied from the laser diode driver circuits $13_1$–$13_{n+1}$. Thus, the data DATA 1–DATA n and the clock signal CLK all of which are electric signals are converted into optical signals in n+1 channels. The optical signals in the n+1 channels are supplied as transmission signals to the array fiber 16 and are transmitted to the receiving link 31.

The photo-diodes $22_1$–$22_{n+1}$ respectively convert the received optical signals in the n+1 channels into electric signals. The pre-amplifiers $23_1$–$23_{n+1}$ respectively amplify the received signals supplied from the photo-diodes $22_1$–$22_{n+1}$ by a predetermined amplification degree and output them.

The limiter amplifiers $24_1$–$24_{n+1}$ each of which is formed of differential amplifiers are connected in multi-stage receive the signals supplied from the pre-amplifiers $23_1$–$23_{n+1}$ and a threshold voltage $V_{ref}$ supplied from the reference circuit 25 as input signals. When the received optical power is large, the limiter amplifiers $24_1$–$24_{n+1}$ limit the level of the signals based on the threshold voltage $V_{ref}$. As a result, in spite of the received optical power, that is, the levels of the outputs of the pre-amplifiers $23_1$–$23_{n+1}$, the levels of input signals of the data decision circuits $32_1$–$32_n$ are constant. Thus, the limiter amplifiers $24_1$–$24_{n+1}$ output binary data signals having a constant amplitude, the binary data signals corresponding to the transmission data DATA 1–DATA n.

The data decision circuits $32_1$–$32_n$ latch the data signals supplied from the limiter amplifiers $24_1$–$24_n$ at falling edges of the received clock signal CLK. The latched data signals are output as output data DATAO 1–DATAO n from the data decision circuits $32_1$–$32_n$. The rising edges and falling edges of the output data DATAO 1–DATAO n is coincident with falling edges of the received clock signal CLK.

FIG. 2A shows a waveform of the output of the pre-amplifiers $23_1$–$23_n$. Due to the variation of optical outputs of the laser diodes $22_1$–$22_n$, the variation of losses of the optical connector and the variation of the transmission losses of the array fiber 16, the levels of the optical received signals differ from each other in the respective channels in the receiving link 31. The variation of the received optical signal in the respective channels makes the levels of the output signals of the pre-amplifiers $23_1$–$23_n$ to be different.

FIG. 2A illustrates waveforms of the output signals of the pre-amplifiers $23_1$–$23_n$ in a minimum level receiving case and in a maximum level receiving case. In the minimum level receiving case, the level of the received optical signal is minimum. In the maximum level receiving, the level of the received optical signal is maximum.

In a case where the threshold voltage $V_{ref}$ which is a fixed value is used as a reference level, the pulse width of the output signal of each of the pre-amplifiers $23_1$–$23_n$ in the minimum level receiving case differs from the pulse width of the output signal in the maximum level receiving case. That is, pulse width distortion OCCURS.

FIG. 2B shows waveforms of output signals of the limiter amplifiers $24_1$–$24_n$ in the maximum level receiving case (a) and in the minimum level receiving case (b). The threshold voltage $V_{ref}$ is generally set at a level close to a center of the output level of the pre-amplifiers $23_1$–$23_n$ in the minimum level receiving case. Thus, in the minimum level receiving case, the eye opening width is expanded in the waveform of the output signal of the limiter amplifiers $24_1$–$24_n$, as shown in FIG. 2B(b). In this case, further, an rising edge and a falling edge are crossed, so that the eye opening is in the optimum state.

On the other hand, in the maximum level receiving case, the eye opening width is deteriorated and narrows in the waveform of the output signal of the limiter amplifiers $24_1$–$24_n$. In this case, further an rising edge and a falling edge are not crossed.

FIG. 3 illustrates an eye opening deterioration caused by the variation of turn-on delay time of the laser diodes $14_1$–$14_n$. In the optical parallel transmission system 30, in order to lower the dissipation power and to simplify the circuits, the APC function is omitted and the laser diodes $14_1$–$14_n$ are used under a condition in which they are biased by "0" volt. Under this condition, due to the variation of a temperature of each of the laser diodes $14_1$–$14_n$, the oscillation threshold of each of the laser diodes $14_1$–$14_n$ is varied. Thus, under this condition, even if the laser diodes $14_1$–$14_n$ are driven by using a single pulse current having a waveform as shown in FIG. 3(A), the variation of the turn-on delay time occurs in the output light of the laser diodes $14_1$–$14_n$ due to the variation of the oscillation threshold, as shown in FIG. 3(B). Due to this variation of the turn-on delay time, the falling edges of the optical receiving signal in the receiving link 31 vary. As a result, the eye opening of the output signal of the limiter amplifiers $24_1$–$24_n$ is deteriorated as shown in FIG. 3(C).

In addition, also jitters of the data and clock CLK deteriorate the eye opening.

Furthermore, circuits of the transmission link 12 and the receiving link 31, the array fiber 16 and the like provide a skew (a delay time difference) between signals of channels.

In the data decision circuits $32_1$–$32_n$, data in the respective channels are latched in each time slot having a period T at falling edges of the single clock CLK reproduced in the receiving link 31. The levels of the latched data are then recognized. Under the condition in which the eye opening is deteriorated and the skew occurs between signals in channels, the data decision circuits $32_1$–$32_n$ have to correctly recognize data.

FIG. 4 illustrates a specified tolerance of the skew between signals in channels. In FIG. 4, meshed portion correspond to ranges in which the eye opening deterioration occurs. It is assumed that the set-up hold time in each of the data decision circuits $32_1$–$32_n$ is equal to "0" so that the set-up hold time in each of the data decision circuits $32_1$–$32_n$ is included in the eye opening deterioration.

FIG. 4(B) shows data having a reference phase which is equal to the phase of the clock CLK. In this case, the center of the period T of data corresponds to the falling edge of the clock CLK.

FIG. 4(A) shows data having the most leading phase in the specified tolerance of the skew. The falling edge of the clock CLK must be not in the ranges in which the eye opening deterioration occurs. Due to the eye opening deterioration, an allowable range of the leading phase is decreased. FIG. 4(C) shows data having the most lagging phase in the specified tolerance of the skew. Due to the eye opening deterioration, the allowable range of the lagging phase is deceased.

As has been described above, in the conventional optical parallel transmission system 30, the specified tolerance of the skew is decreased so as to be less than the eye opening width. Thus, the skew allowed for the transmission link 12, the receiving link 31, and the array fiber 16 becomes small, so that the degree of freedom of the system is decreased.

SUMMARY OF THE INVENTION

Accordingly, a general object of the present invention is to provide a novel and useful data decision circuit used in an optical parallel receiving module, optical parallel receiving module, optical parallel transmission system and terminal structure of an optical transmission fiber.

A specific object of the present invention is to provide a data decision circuit in which the specific tolerance of the skew is prevented from being decreased by the eye opening deterioration.

The above objects of the present invention are achieved by a data decision circuit used in an optical parallel receiving module in an optical parallel transmission system in which optical signals corresponding to data in a plurality of channels are transmitted using fibers in parallel, the optical parallel receiving module converting the optical signals into received signals which are electric signals and generating received data based on a predetermined threshold level and the received signals, the data decision circuit recognizing data in a channel at a predetermined timing in every period of the received data, the data decision circuit comprising: data edge position detecting means for detecting in which region of a plurality of regions a rising edge of the received data is and for outputting a detecting signal corresponding to a detected region, one period of the received data having a reference phase equal to a phase of the reference clock sinal being divided into the plurality of regions; and data acquisition means to which a plurality of clocks having different phases and the detecting signal from the data edge position detecting means are supplied, each of the plurality of clocks corresponding to one of the plurality of regions, for acquiring data at a timing of a clock corresponding to the region in which the rising edge of the received data is detected by the data edge position detecting means.

According to the present invention, data can be recognized at an edge of a clock having an optimum phase. As a result, even if an eye opening is deteriorated, the data can be correctly recognized in an eye opening.

Another object of the present invention is to provide an optical parallel receiving module using the above data decision circuit.

The object of the present invention is achieved by an optical parallel receiving module comprising: a photo-diode array connecting an array optical fiber; an analog integrated circuit in which pre-amplifiers for amplifying output signals of the photo-diode array and comparing circuits for comparing output signals of the pre-amplifiers and a fixed threshold level are integrated as a monolithic integrated circuit; and a digital integrated circuit in which data decision circuits receiving output signals of the analog integrated circuit are integrated as a monolithic integrated circuit, wherein the photo-diode array, the analog integrated circuit and the digital integrated circuit are formed in a single base.

The above objects of the present invention are also achieved by an optical parallel receiving module which receives optical signals transmitted in parallel in a plurality of channels by using optical fibers, the optical parallel receiving module comprising: photo-electric conversion means for converting received signals which are electric signals as received signals; comparing means for comparing the received signals and a threshold level; and data recognition means for recognizing data at a timing in every period of received data using a reference clock, the data recognition means having data edge position detecting means for detecting in which region of a plurality of regions a rising edge of the received data is and for outputting a detecting signal corresponding to a detected region, one period of the received data having a reference phase equal to a phase of the reference clock sinal being divided into the plurality of regions; and data acquisition means to which a plurality of clocks having different phases and the detecting signal from the data edge position detecting means are supplied, each of the plurality of clocks corresponding to one of the plurality of regions, for acquiring data at a timing of a clock corresponding to the region in which the rising edge of the received data is detected by the data edge position detecting means.

Another object of the present invention is to provide an optical parallel receiving module which can perform an optical parallel communication.

The object of the present invention is achieved by an optical parallel receiving module having a plurality of data channels in each of which a received signal is generated as an electric signal from an optical signal corresponding to data transmitted through an optical path and received data is then generated based on the received signal and a clock channel in which a received signal is generated as an electric signal from an optical signal corresponding to a clock and a received clock is generated based on the received signal, data being recognized from the received data in each data channel at a timing specified by the received clock in the clock channel, the optical parallel receiving module comprising: receiving data generating means for generating the received data from the received signal in each data channel with reference to a fixed threshold level; threshold generating means for generating a threshold level based on the received signal in the clock channel; and clock generating means for generating the received clock from the received signal in the clock channel with reference to the threshold level generated by the threshold generating means.

According to the present invention, the optical communication can be stably carried out.

Still another object of the present invention is to provide an optical parallel transmission system which can perform an optical parallel communication.

The above object of the present invention is achieved by an optical parallel transmission system The object of the present invention is achieved by an optical parallel transmission system having a plurality of data channel in which data is transmitted through an optical transmission path and a clock channel in which a timing signal is transmitted through an optical transmission path, the data and the timing being transmitted from an optical transmission link to an optical receiving link in parallel using the plurality of data channels and the clock channel, the optical parallel transmission system comprising: random signal output means, provided in the optical transmission link, for generating a pseudo random signal based on a predetermined clock and for supplying the pseudo random signal to the clock channel; clock reproduction means, provided in the optical receiving link, for extracting the predetermined clock, which is to be used as the timing signal, from the pseudo random signal in the clock channel.

The above object of the present invention is also achieved by an optical parallel transmission system having a plurality of channels in which optical signals are transmitted, each of the plurality channels being provided with a light emission element emitting an optical signal, an optical transmission path through which the optical signal emitted from the light emission element is transmitted and photo-detecting element for detecting the optical signal transmitted through the optical transmission path so that the optical signals are transmitted in the respective channels in parallel, the optical parallel transmission system comprising: monitor means for monitoring states of the optical signals in the respective channels; control means for controlling, based on a result obtained by the monitor means, power of the optical signals incident to the photo-detecting elements so that variation of the power of the optical signal is reduced.

According to the present invention, the optical communication can be stably carried out.

Another object of the present invention is to provide a terminal structure of an optical transmission fiber by which optical communication having a high stability can be maintained.

The object of the present invention is achieved by a terminal structure of an optical transmission fiber comprising: a fiber supporting structure, made of plastic, for arranging and supporting one or a plurality of fibers; and a mounting member, made of metal, which is provided on an outer surface of the supporting structure.

According to the present invention, a terminal structure of the optical transmission fiber having a high reliability can be obtained.

BRIEF DESCRIPTION OF THE DRAWINGS

Other objects, features and advantages of the present invention will become apparent from the following description when read in conjunction with the accompanying of drawings, in which:

FIG. 2A is a diagram illustrating examples of output waveforms of each of pre-amplifiers shown in FIG. 1;

FIG. 2B is a diagram illustrating states of the eye opening in a maximum level receiving case and in a minimum level receiving case;

FIG. 3 is a waveform diagram illustrating the eye opening deterioration;

FIG. 4 is a diagram illustrating a specific tolerance of the skew between data in channels;

FIG. 5 is a block diagram illustrating the principle of a data decision circuit according to the present invention;

FIG. 9 is a timing chart illustrating received data and four-phase clocks;

FIG. 10 is a diagram illustrating phases of the received data and timings at which the received data is recognized;

FIG. 11 is a diagram illustrating phases of the received data and recognition timings in a case where the eye opening deterioration width is small;

FIGS. 12A and 12B are timing charts illustrating operations of the data decision circuit according to the first embodiment of the present invention;

DESCRIPTION OF THE PREFERRED EMBODIMENTS

First, a description will be given, with reference to FIG. 5, of the principle of the data decision circuit according to the present invention.

This data decision circuit is used in an optical parallel receiving module in an optical parallel transmission system. In the optical transmission system, data in a plurality of channels are transmitted, as optical signals, in parallel using optical fibers. In a receiving link side, received optical signals are converted into electric signals (received signals), the received signals are then compared with a predetermined threshold value and received data is generated. Data is recognized at a predetermined timing decided by a clock every period of the received data.

Referring to FIG. 5, the data decision circuit has a data edge position detecting unit 100 and a data acquisition unit 200. The data edge position detecting unit 100 detects which region of a plurality of regions a rising edge of the received data is in, the plurality of regions being obtained by dividing a period of received data having a reference phase which is equal to a phase of the clock. The data edge position detecting unit 100 thus outputs a detecting signal.

The data acquisition unit 200 is supplied with a plurality of clocks and the above detecting signal. The plurality of clocks have phases which differ from each other, each of the phases corresponding to one of the plurality of region described above. The data acquisition unit 200 acquires data at an edge of a clock corresponding to a region in which a rising edge of the received data, and outputs the acquired data.

According to the data decision circuit described above, data is recognized (acquired) using a clock having a phase corresponding to a region in which a rising edge of the received data exists. Thus, even if the skew is provided between the received data in channels, the data can be accurately recognized within the eye opening of the received data. The specific tolerance of the skew can be prevent from being decreased by the eye opening deterioration.

A description will now be given of embodiments of the present invention.

Figure 1:
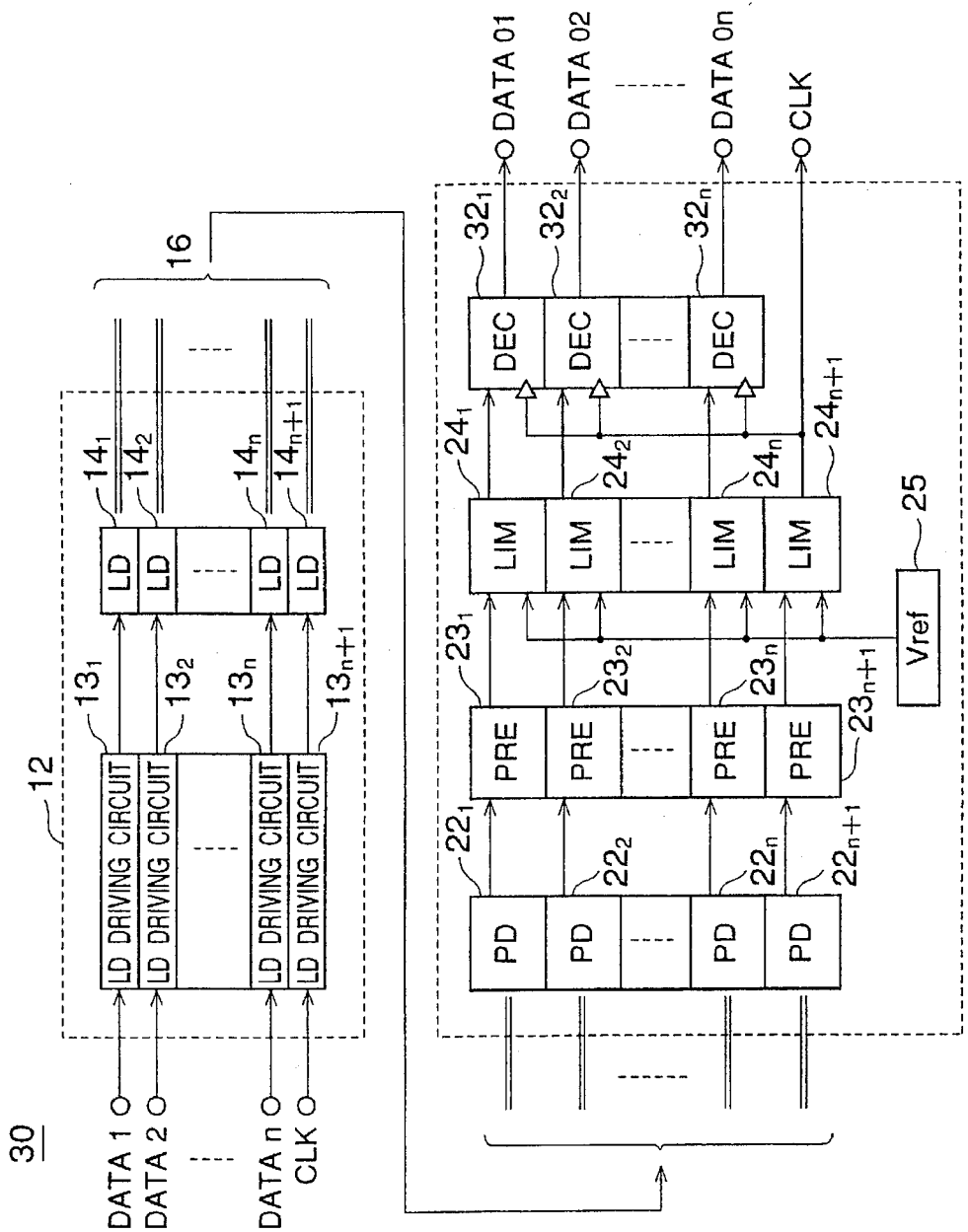
FIG. 1 is a block diagram illustrating a conventional optical parallel transmission system.
Figure 6:
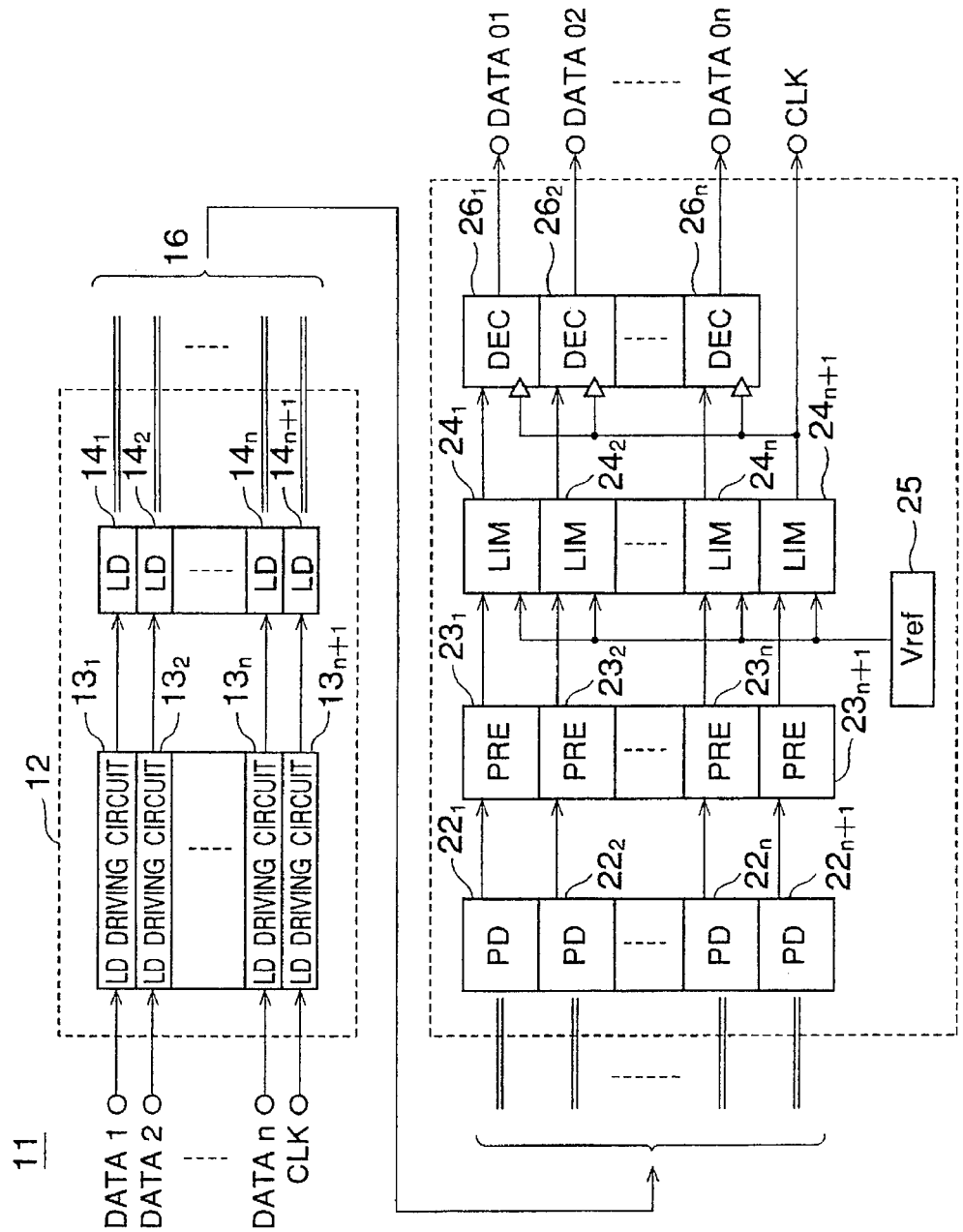
FIG. 6 is a block diagram illustrating an optical parallel transmission system using a data decision circuit according to a first embodiment.

FIG. 6 shows an optical parallel transmission system to which the data decision circuit according to a first embodiment of the present invention. In FIG. 6, those parts which are the same as those shown in FIG. 1 are given the same reference numbers.

Referring to FIG. 6, the optical parallel transmission system has (n+1) channels. Data (DATA 1–DATA n) are assigned to 1st through n-th channels and a clock CLK is assigned to a (n+1)-th channel. The optical parallel transmission system has the transmission link 12 and a receiving link 21 including data decision circuits $26_1$–$26n$ according to the present invention. The transmission link 12 has the laser diode driving circuits $13_1$–$13_{n+1}$ and laser diodes $14_1$–$14_{n+1}$. The receiving link 21 has the photo-diodes $22_1$–$22_{n+1}$, the pre-amplifiers $23_1$–$23_{n+1}$, the limiter amplifiers $24_1$–$24_{n+1}$, the reference circuit 25 and the data decision circuits $26_1$–$26_n$. The data decision circuits $26_1$–$26_n$ are formed, for example, in a monolithic integrated circuit. The laser diodes $14_1$–$14_{n+1}$ of the transmission link 12 and the photo-diodes $22_1$–$22_{n+1}$ are connected by the array fiber 16.

Figure 7:
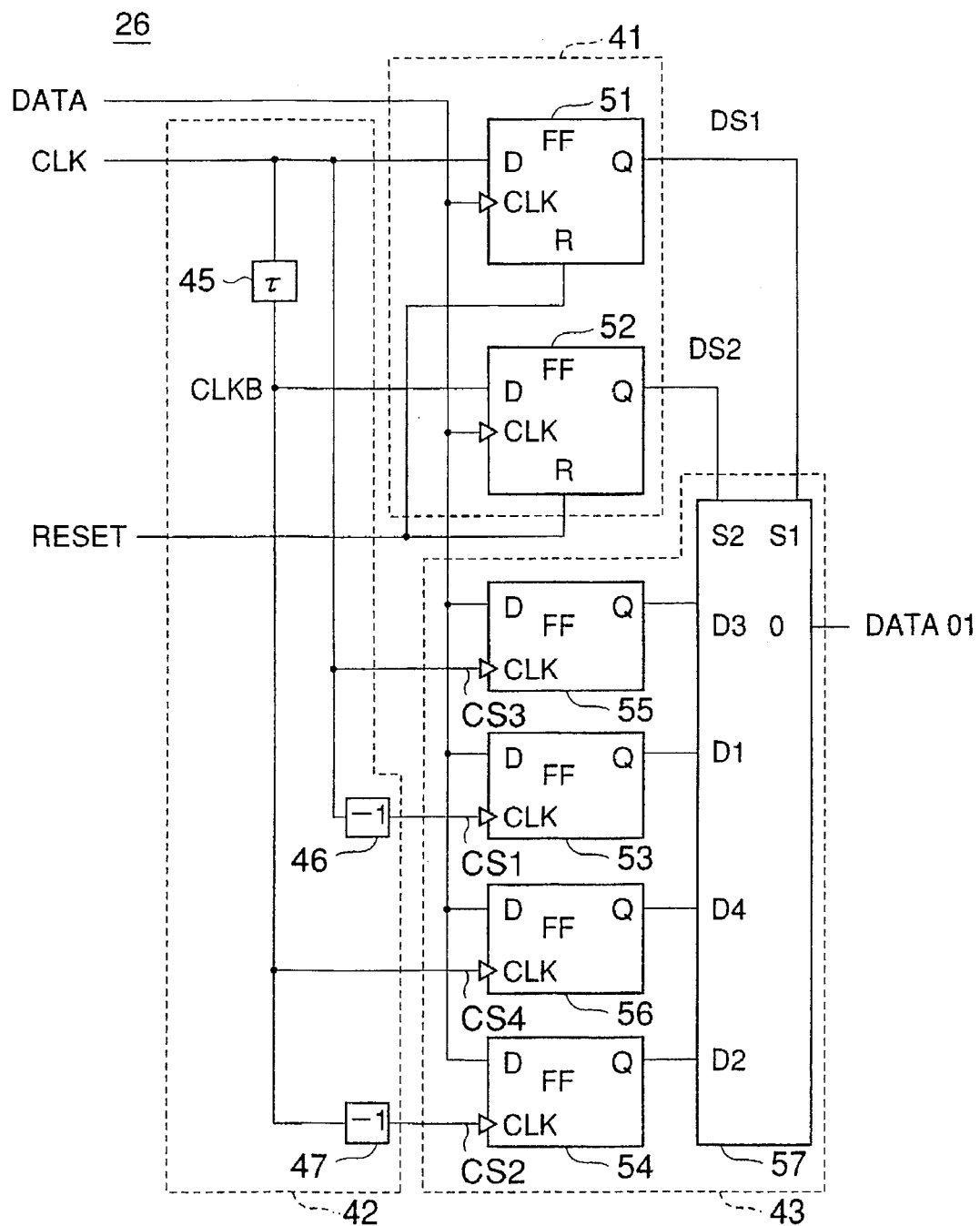
FIG. 7 is a block diagram illustrating the data decision circuit.

The data decision circuits $26_1$–$26_n$ have the same structure as shown in FIG. 7. A data decision circuit $26_1$ in the first channel will be typically described below. Referring to FIG. 7, the data decision circuit $26_1$ has a data edge position detecting circuit 41, a four-phase clock generating circuit 42 and a data acquisition circuit 43. The data edge position detecting circuit 41 is formed of flip flops 51 and 52. The four-phase clock generating circuit 42 is formed of a delay circuit 45 and inverter circuits 46 and 47. The data acquisition circuit 43 is formed of flip flops 53–56 and a selector circuit 57.

Four regions into which one period T (one time slot) of the received data is divided are set in the data decision circuit $26_1$. The four regions and four-phase clocks corresponding thereto are shown in FIG. 9. It is assumed that the received data output from the limiter amplifier $24_1$ has an eye opening which is at least T/2.

A received clock CLK used as a standard clock is shown in FIG. 9(B), and received data having a standard phase equal to a phase of the received clock CLK is shown in FIG. 9(A). One period T of the received data having the standard phase is divided into four regions Z1–Z4.

The first region Z1 is defined as a region from a starting time "0" of the period T to a time "τ" where "τ" is greater than a width of the range in which the eye opening is deteriorated and is not greater than T/4.

The second region Z2 is defined as a region from the time "τ" to a time T/2. The third region Z3 is defined as a region from the time T/2 to a time (T/2+τ). The fourth region Z4 is defined a region from the time (T/2+τ) to a time T.

Data is latched in a phase of different four phases in accordance with which region a rising edge of the received data is in. Thus, the four-phase clock generating circuit 42 generates four clocks having different phases.

In the four-phase clock generating circuit 42, the received clock CLK is delayed by τ by the delay line 45 so that a clock CLKB as shown in FIG. 9(C) is generated. The received clock CLK is inverted by the inverter circuit 46 so that a first clock CS1 as shown in FIG. 9(D) is generated. The received clock CLK is used as a third clock CS3 as shown in FIG. 9(B). The clock CLKB is inverted by the inverter circuit 47 so that a second clock CS2 as shown in FIG. 9(E) is generated. the clock CLKB is used as a fourth clock CS4.

The received clock CLK has a falling edge used to recognize the received data, which edge is located in a boundary $t_{R1}$ between the second region Z2 and the third region Z3. The first clock CS1 has a rising edge used to recognize the received data, which edge is located in the boundary $t_{R1}$ between the second region Z2 and the third region Z3. The second clock CS2 has a rising edge used to recognize the received data, which edge is located in a boundary $t_{R2}$ between the third region Z3 and the fourth region Z4. The third clock CS3 has a rising edge used to recognize the received data, which edge is located in a boundary $t_{R3}$ between the fourth region Z4 and the first region Z1. The fourth clock CS4 has an rising edge used to recognize the received data, which edge is located in a boundary $t_{R4}$ between the first region Z1 and the second region Z2.

Returning to FIG. 7, clock input terminals CLK of the flip flops 51 and 52 of the data edge position detecting circuit 41 are supplied with the received data. A data input terminal D of the flip flop 51 is supplied with the received clock CLK, that is, the third clock CS3. A data input terminal D of the flip flop 52 is supplied with the clock CLKB, that is, the fourth clock CS4.

The flip flop 51 latches a level of the third clock CS3 at a rising edge of the received data, and outputs, as a signal DS1, the latched level from an output terminal Q. The flip flop 52 latches a level of the fourth clock CS4 at a rising edge of the received data, and outputs, as a signal DS2, the latched level from an output terminal Q.

The levels of the signals DS1 and DS2 depend on which region of the regions Z1–Z4 a rising edge of the received data is in.

The phase difference between the third clock CS3 and the fourth clock CS4 is τ as shown in FIG. 9. Thus, when a rising edge of the received data is in the first region Z1, the signal DS1 has a high level (hereinafter referred to as an "H" level) and the signal DS2 has a low level (hereinafter referred to as an "L" level). When a rising edge of the received data is in the second region Z2, both the signals DS1 and DS2 have the "H" level. When a rising edge of the received data is in the third region Z3, the signal DS1 has the "L" level and the signal DS2 has the "H" level. When a rising edge of the received data is in the fourth region Z4, both the signals DS1 and DS2 have the "L" level.

These signals DS1 and DS2 are supplied, as the detecting signal, to select terminals S1 and S2 of the selector circuit 57 in the data acquisition circuit 43.

Respective clock input terminals CLK of the flip flops 53, 54, 55 and 56 of the data acquisition circuit 43 are supplied with the first through fourth clocks CS1–CS4. Data input terminals D of the flip flops 53–56 are supplied with the received data. Thus, the respective flip fops 53–56 latch the received data at rising edges of the clocks CS1–CS4 and output latched data from output terminals Q. The output signals of the flip lops 51–56 are respectively supplied to input terminals D1–D4 of the selector circuit 57.

Figure 8:
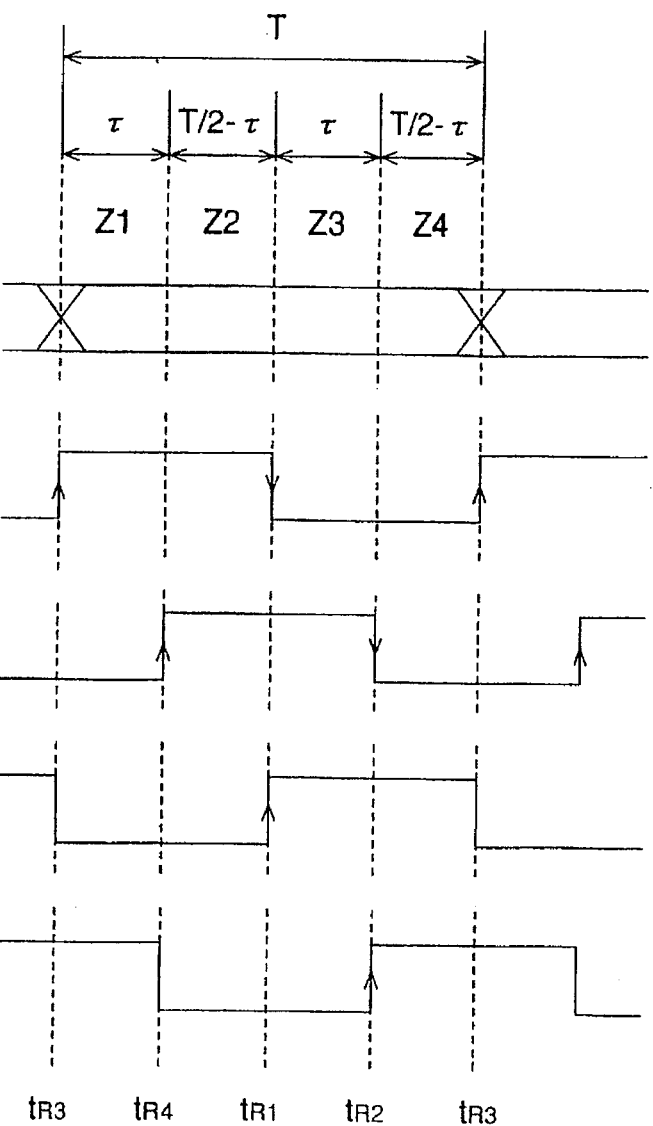
FIG. 8 is a truth table illustrating an operation of a selector shown in FIG. 7.

FIG. 8 shows a truth table indicating relationships between sets of levels of the select terminals S1 and S2 of the selector circuit 57 and selected input terminals D1–D4. The truth table further indicates the regions Z1–Z2 corresponding to the sets of the levels of the select terminals S1 and S2 of the selector circuit 57, in which regions rising edges of the received data are detected.

When a rising edge of the received data is detected in one of the regions Z1–Z4, the selector circuit 57 selects a corresponding input terminal from among the input terminals D1–D4 in accordance with the truth table shown in FIG. 8 and outputs from the output terminal Q a signal supplied to the selected input terminal. That is, when a rising edge of the received data is in the first region Z1, data latched at a rising edge of the first clock CS1, that is, at a time $t_{R1}$ is output as recognized data from the data decision circuit $26_1$. When a rising edge of the received data is in the second region Z2, data latched at a rising edge of the second clock CS2, that is, at a time $t_{R2}$ is output as recognized data. When a rising edge of the received data is in the third region Z3, data latched at a rising edge of the third clock CS3, that is, at a time $t_{R3}$ is output as recognized data. When a rising edge of the received data is in the fourth region Z4, data latched at a rising edge of the fourth clock CS4, that is, at a time $t_{R4}$ is output as recognized data.

A description will now be given, with reference to FIG. 10, of phases of the received data and timings at which the received data is recognized.

FIG. 10 shows the received data in typical eight phases in a case where a width of both ranges in which the eye opening deterioration occurs is equal to T/2. In FIG. 10, meshed portions correspond to the range in which the eye opening deterioration occurs. In this case, one-sided range in which the eye opening deterioration occurs is equal to T/4. A set-up hold time of each of the decision circuits $26_1$–$26_n$ is included in the range in which the eye opening deterioration occurs.

In a case where the received data has a phase 1 as shown in FIG. 10(A) and FIG. 10(I), it is detected that a rising edge of the received data is in the first region Z1. As a result, data latched at the time $t_{R1}$ corresponding to a falling edge of the received clock CLK (that is, a rising edge of the first clock CS1) is output as the recognized data.

Due to the distortion of the pulse width, the difference between light-turn-on delay times, the jitters and the like as has been described above, it is unspecified where a rising edge of the received data is located in a meshed portion. However, even if a rising edge of the received data is located in any position in the meshed portion, the data can be correctly recognized at the time $t_{R1}$ corresponding to a rising edge of the first clock CS1 within the eye opening.

In respective cases where the received data has phases 3, 5 and 7 as shown in FIG. 10(C), FIG. 10(E) and FIG. 10(G), it is detected that a rising edge of the received data is in the second region Z2, the third region Z3 and the fourth region Z4. As a result, data latched at times $t_{R2}$, $t_{R3}$ and $t_{R4}$ are output as the recognized data. Thus, the data can be correctly recognized in the eye opening in the respective cases.

When the received data has a phase 2 as show in FIG. 10(B), there may be two cases where the data is recognized. In the first case, a rising edge of the received data is in the first region Z1, so that the data is recognized at the time $t_{R1}$. In the second case, a rising edge of the received data is in the second region Z2, so that the data is recognized at the time $t_{R2}$. In both the cases, the data can be correctly recognized in the eye opening.

In respective cases where the received data has phases 4, 6 and 8 as shown in FIG. 10(D), FIG. 10(F) and FIG. 10(H), the data can be correctly recognized in the eye opening in the same manner as in the case where the received data has the phase 2.

FIG. 11 shows phases of the received data and timings at which the received data is recognized in a case where the width of range in which the eye opening is deteriorated is less than T/2. In this case, even if the received data have any phase of phases 1–8 as shown in FIG. 11(A)–FIG. 11(I), the received data can be correctly recognized in the eye opening, in the same manner as in the case shown in FIG. 10.

In this case, the delay time τ of the delay line 45 is set at value slightly greater than the width of the one-sided range in which the eye opening is deteriorated. The delay time τ may be increased to T/4. Thus, a high accuracy of the delay time τ is not required. This matter is of advantage to forming the data decision circuits $26_1$–$26_n$ as an LSI.

FIGS. 12A and 12B show operations of the data decision circuit $26_1$ in two cases.

In the first case shown in FIG. 12A, the data decision circuit $26_1$ operates as follows.

When there is no eye opening deterioration in the received data, a rising edge of the received data is at a time $t_1$ in the first region Z1. The select terminals S1 and S2 of the selector circuit 57 are respectively set at the "H" level and the "L" level at the time $t_1$. In this case, the selector circuit 57 selects the input terminal D1. Thus, the received data is recognized at the time $t_{R1}$ corresponding to a falling edge of the received clock CLk (a rising edge of the first clock CS1), and the recognized data is output from the output terminal Q of the selector circuit 57.

After this, a state that the input terminal D1 is selected is maintained until the next rising edge of the received data is detected. As a result, the received data is recognized at the time $t_{R1}$ in every period.

When, due to the eye opening deterioration in the received data, a rising edge of the received data is at the time $t_2$ in the second region Z2, both the select terminals S1 and S2 of the selector circuit 57 are set to the "H" level at the time $t_2$. In this case, the selector circuit 57 selects the input terminal D2. Thus, the received data is recognized ta the time $t_{R2}$ corresponding to a falling edge of the received clock CLK (a rising edge of the second clock CS2), and the recognized data is output from the output terminal Q of the selector circuit 57.

After this, a state where the input terminal D2 is selected is maintained until the next rising edge of the received data is detected. As a result, the received data is recognized at the time $t_{R2}$ in every period.

In the second case shown in FIG. 12B, the data decision circuit $26_1$ operates as follows.

When there is no eye opening deterioration in the received data, a rising edge of the received data is at a time $t_3$ in the third region Z1. The select terminals S1 and S2 of the selector circuit 57 are respectively set at the "L" level and the "H" level at the time $t_3$. In this case, the selector circuit 57 selects the input terminal D3. Thus, the received data is recognized at the time $t_{R3}$ corresponding to a rising edge of the received clock CLK (a falling edge of the third clock CS3), and the recognized data is output from the output terminal Q of the selector circuit 57.

After this, a state where the input terminal D3 is selected is maintained until the next rising edge of the received data is detected. As a result, the received data is recognized at the time $t_{R3}$ in every period.

When, due to the eye opening deterioration in the received data, a rising edge of the received data is at a time $t_4$ in the fourth region Z4, both the select terminals S1 and S2 of the selector circuit 57 are set at the "L" level at the time $t_4$. In this case, the selector circuit 57 selects the input terminal D4. Thus, the received data is recognized at the time $t_{R4}$ corresponding to a rising edge of the received clock CLK (a rising edge of the fourth clock CS4), and the recognized data is output from the output terminal Q of the selector circuit 57.

After this, a state where the input terminal D4 is selected is maintained until the next rising edge of the received data is detected. As a result, the received data is recognized at the time $t_{R4}$ in every period.

As has been described above, in each of the data decision circuit $26_1$–$26_n$, it is detected which region of the plurality of regions Z1–Z2 into which one period T is divided a rising edge of the received data is in. The received data is recognized at a rising edge of a clock, out of the clocks CS1–CS4, corresponding to the region in which the rising edge of the received data has been detected. Therefore, without regard to the phase variation of the received data caused by the skew, the data can be correctly recognized in the eye opening. Thus, the specific tolerance of the skew is prevented from being decreased based on the eye opening deterioration.

The specific tolerance of the skew can be unlimitedly close to the period T in a case where there is no eye opening deterioration.

Since the specific tolerance of the skew is prevented from being decreased, the skew allowed for the transmission link 12, the receiving link 21 and the array fiber 16 becomes large, so that the degree of freedom in the system design can become large.

If output data from the respective data decision circuits 261–26n are latched again by using the same clock (e.g. the first clock CS1), the output data having the same phase in all the channels can be generated.

Figure 13:
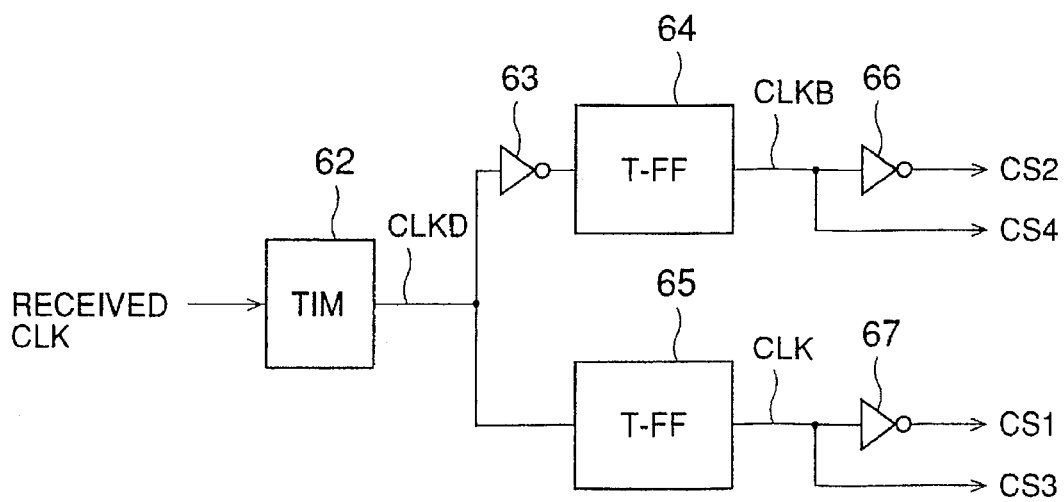
FIG. 13 is a block diagram illustrating another example of a four-phase clock generating circuit.

The four-phase clock generating circuit 42 may be also formed as shown in FIG. 13. Referring to FIG. 13, a four-phase clock generating circuit 61 has a timing circuit 62, inverter circuits 63, 66 and 67 and toggle-flip-flops 64 and 65.

The timing circuit 62 is formed, for example, of a combination of an NRZ-RZ converter circuit, a SAW filter and amplifiers. The timing circuit 62 generates a clock CLKD synchronized with the received clock CLK, the clock having a frequency two times as large as that of the received clock CLK.

The toggle-flip-flop 65 is supplied with the clock CLKD from the timing circuit 62 and generates a clock CLK which is the same as the received clock CLK. The clock CLK generated by the toggle-flip-flop 65 is used as the third clock CD3. The clock CLK generated by the toggle-flip-flop 65 is inverted by the inverter circuit 67. An output clock from the inverter circuit 67 is used as the first clock CS1.

The clock CLKD output from the timing circuit 62 is inverted by the inverter circuit 63 and the inverted clock is supplied to the toggle-flip-flop 64. The toggle-flip-flop 64 generates a clock CLKB which is delayed from the clock CLK by T/4. The clock CLKB from the toggle-flip-flop 64 is used as the fourth clock CS4. The clock CLKB is inverted by the inverter circuit 66, and the inverted clock is used as the second clock CS2.

Rising edges of the respective clocks CS1–CS4 generated by the four-phase clock generating circuit 61 are timings at which the received data is recognized.

As has been described above, the four-phase clock generating circuit 61 can be formed without delay lines.

Figure 14:
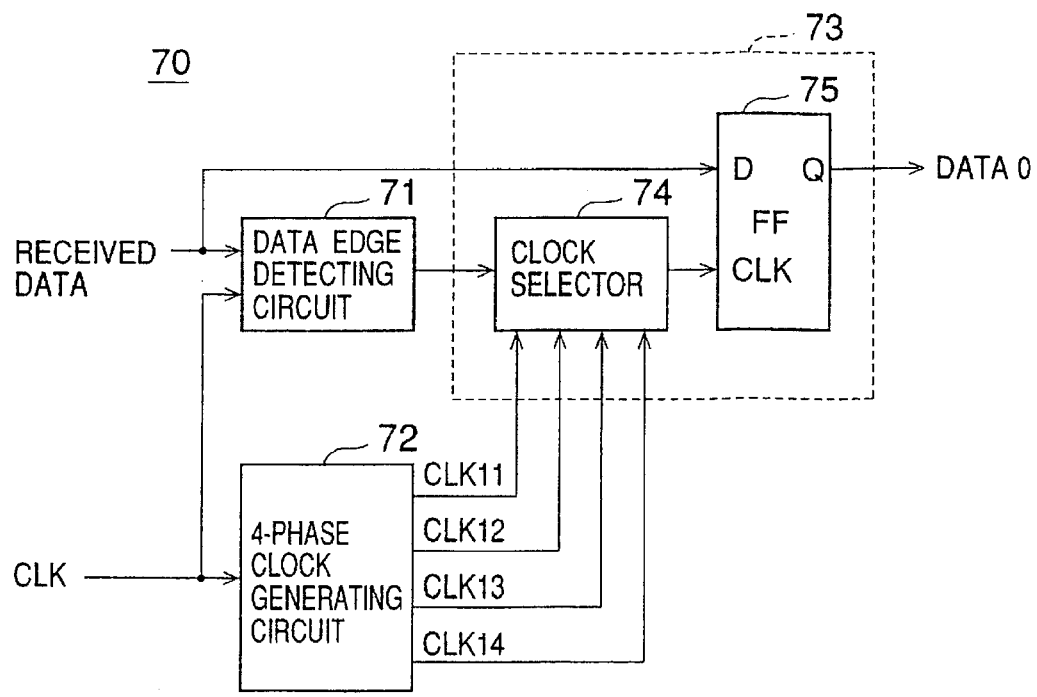
FIG. 14 is a block diagram illustrating the data decision circuit according to a second embodiment of the present invention.
Figure 15:
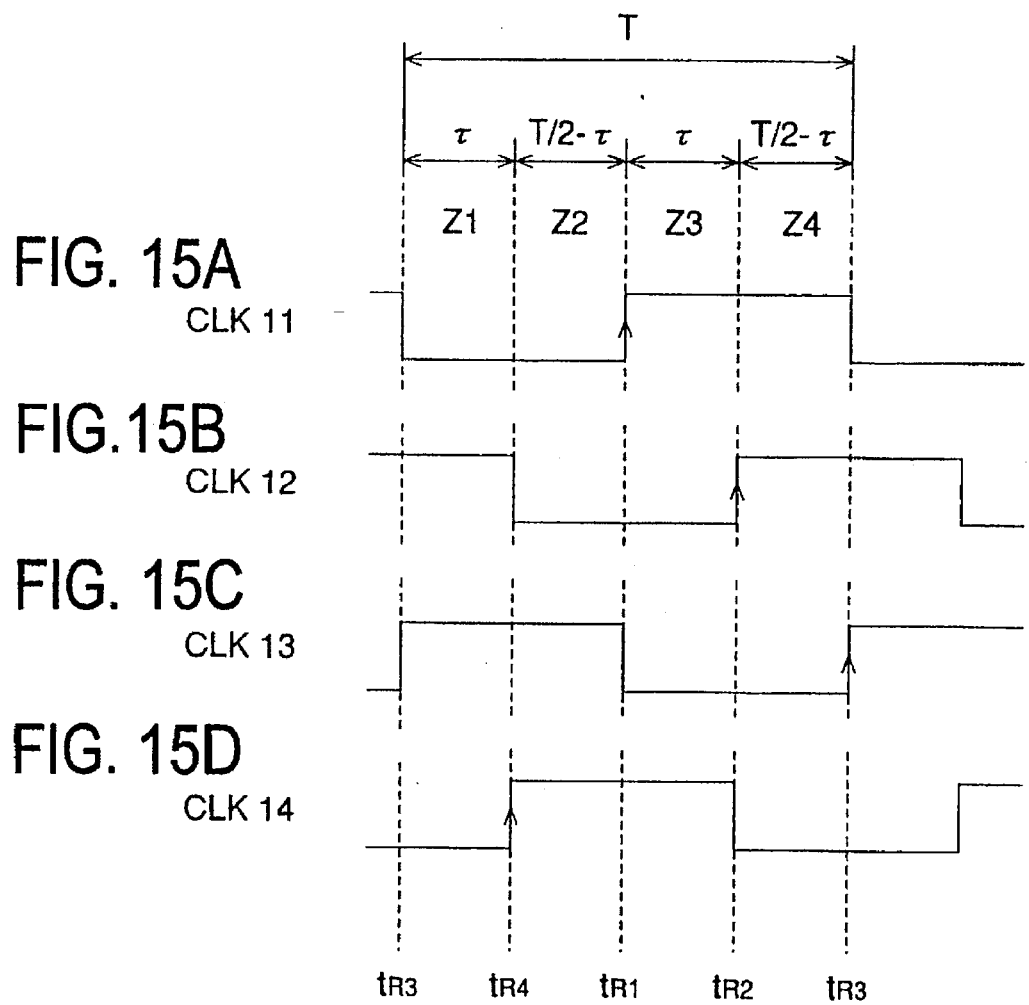
FIG. 15 is a timing chart illustrating divided region of one period and four-phase clocks.

FIG. 14 shows a data decision circuit according to a second embodiment of the present invention. FIG. 15 shows regions into which one period of the received data is divided and clocks having different four phases, in a data decision circuit as show in FIG. 14.

Referring to FIG. 14, a data decision circuit 70 has a data edge position detecting circuit 71, a four-phase clock generating circuit 72 and a data acquisition circuit 73. The data acquisition circuit 73 is formed of a clock selector 74 and a flip flop 75.

In the decision circuit 70, one period T of the received data is divided into four regions Z1, Z2, Z3 and Z4, in the same manner as in the above embodiment. The data edge position detecting circuit 71 detects, using the received clock CLK, which region a rising edge of the received data is in and supplies a detecting signal to the clock selector 74 of the data acquisition circuit 73.

The four-phase clock generating circuit 72 generates four clocks having different phases, as shown in FIG. 15 (A)–(D). A first clock CLK11 corresponding to a first region Z1 has a rising edge, used to recognize the received data, at a time $t_{R1}$ in a boundary between the regions Z2 and Z3. This clock CLK11 is obtained by inversion of the received clock CLK. A second clock CLK12 corresponding to the second region Z2 has a rising edge, used to recognize the received data, at a time $t_{R2}$ in a boundary between the regions Z3 and Z4.

A third clock CLK13 corresponding to the third region Z3 has a rising edge, used to recognize the received data, at a time $t_{R3}$ in a boundary between the regions Z4 and Z1. A fourth clock CLK14 corresponding to the fourth region Z4 has a rising edge, used to recognize the received data, at a time tR4 in a boundary between the regions Z1 and Z2.

The clock selector 74 selects a clock from among the clocks CLK11–CLK14 based on the detecting signal supplied from the data edge position detecting circuit 71. The selected clock corresponds to one of the regions Z1–Z4, in which one a rising edge of the received data is detected. The selected clock is supplied to a clock input terminal CLK of the flip flop 75.

The flip flop 75 latches the received data at a rising edge of the selected clock supplied from the clock selector 74, the latched data is output from the output terminal Q as recognized data DATAO.

As has been described above, the data decision circuit 70 recognizes the received data at a rising edge of the clock, corresponding to the region in which the rising edge of the received data is detected, out of the clocks CLK11–CLK14. Thus, without regard to the skew, the received data can be correctly recognized in the eye opening. As a result, the specific tolerance of the skew is prevented from being decreased by the eye opening deterioration.

Figure 16:
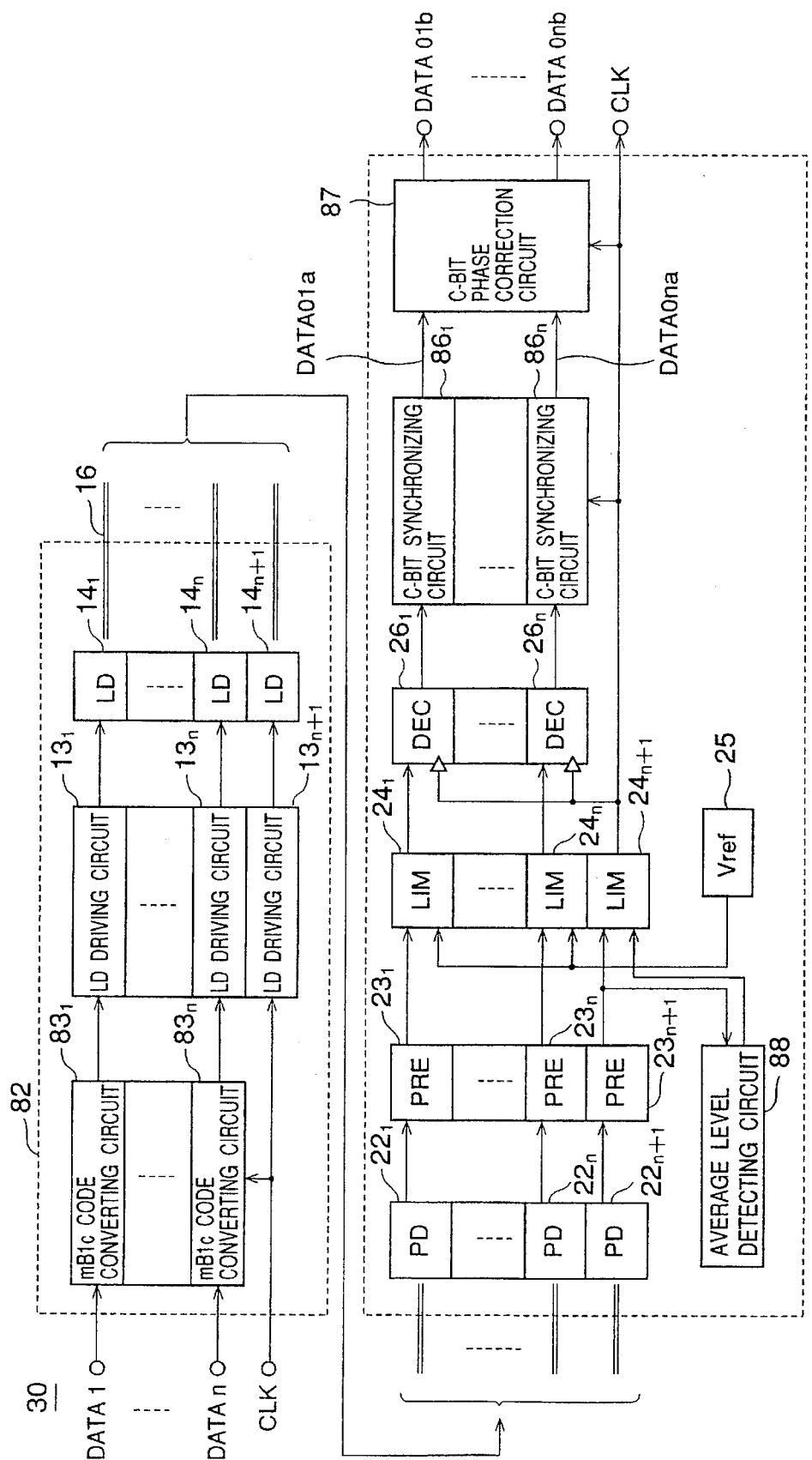
FIG. 16 is a block diagram illustrating an optical parallel transmission system using an optical parallel receiving ling according to a third embodiment of the present invention.

FIG. 16 shows an optical parallel transmission system having an optical parallel receiving link according to a third embodiment of the present invention. In FIG. 16, those parts which are the same as those shown in FIG. 6 are given the same references.

Referring to FIG. 16, a transmission link 82 has mB1C code converting circuits $83_1$–$83_n$ corresponding to the data channels in addition to the laser diode driving circuits $13_1$–$13_{n+1}$ and the laser didos $14_1$–$14_{n+1}$. In each of the mB1C code converting circuits $83_1$–$83_n$, a C code (a complementary code) of one bit is added to every m bits (e.g. 10 bits) of the data DATA.

An optical parallel receiving link 85 has C-bit synchronizing circuits $86_1$–$86_n$ and a C-bit phase correction circuit 87 in addition to the data decision circuits $26_1$–$26_n$. The optical parallel receiving link 85 further has an average detecting circuit 88. The average detecting circuit 88 detects an average level of the clock supplied from the pre-amplifier $23_{n+1}$ in the clock channel. The average level detected by the average detecting circuit 88 is supplied, as a threshold voltage for the clock, to the limiter amplifier $24_{n+1}$ in the clock channel. The threshold voltage $V_{ref}$ from the reference circuit 25 may be used for the clock channel.

Figure 17A:
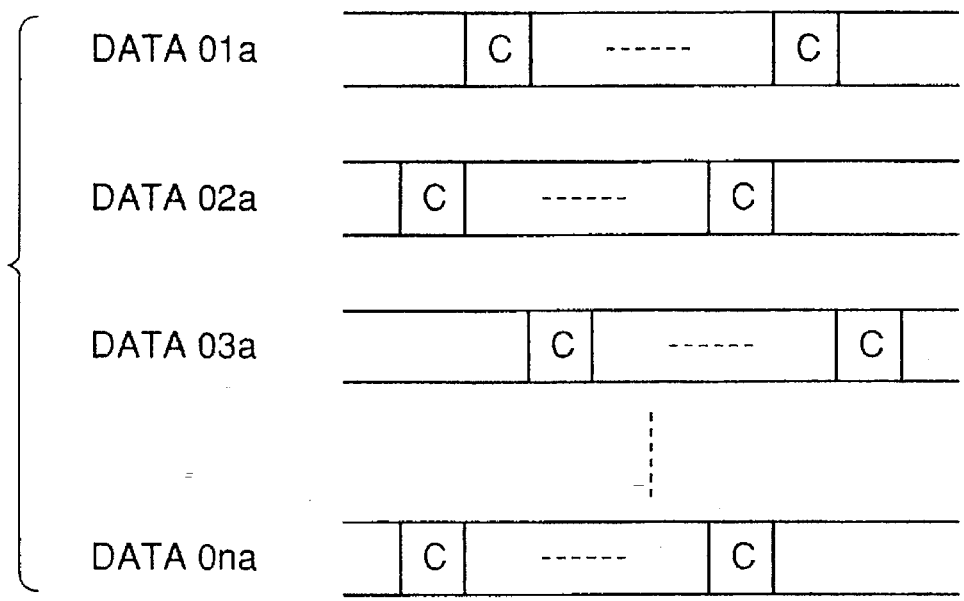
FIGS. 17A and 17B are diagrams illustrating phase correction of output data using C bits.
Figure 17B:
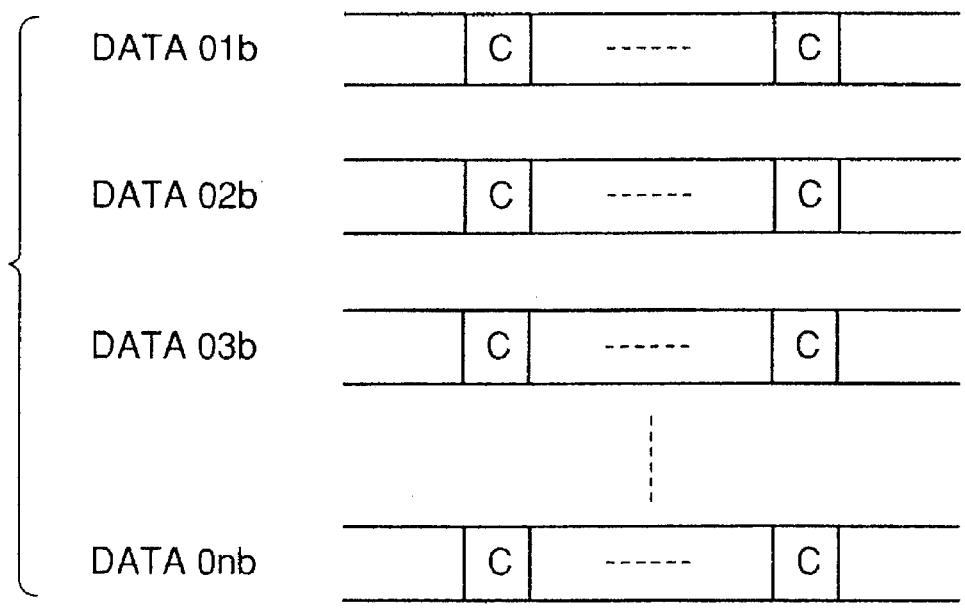

A description will now be given, with reference to FIGS. 17A and 17B, of an operation of phase correction using the C-bit.

In a case where the amount of skew between recognized data output from each two of the data decision circuits $26_1$–$26_n$ in the data channels exceeds one bit, bit-shift occurs between data channels. Each of the C-bit synchronizing circuits $86_1$–$86_n$ detects a phase of the C-bit in the recognized data supplied from a corresponding one of the data decision circuits $26_1$–$26_n$ in the respective data channels. The C-bit synchronizing circuit $86_1$–$86_n$ outputs data DATAO1a DATAO na in which the C-bit is detected as shown in FIG. 17A.

The C-bit phase correction circuit 87 detects the phase variation among the data DATAO 1a–DATAO na supplied from the C-bit synchronizing circuits 861–86n. The C-bit phase correction circuit 87 corrects the phases of the data in the respective data channels so that phases of the C-bits of the data in the respective data channels are coincident with each other. As a result, the data DATAO 1a–DATAO na in which the phases of the C-bit are coincident with each other, as shown in FIG. 17, are output from the C-bit correction circuit 87.

As has been described above, even if the phase variation of data in the data channels exceeds one bit, the phases of the data are corrected based on the phases of the C-bit so as to be coincident with each other. Thus, unless the amount of skew in the data channels exceeds m bits, the data correctly recognized in the respective data channels can be output without the bit-shift.

Now, in the conventional optical parallel transmission system having the limiter amplifiers $24_1$–$24_{n+1}$ into which the fixed threshold method is adopted as shown in FIG. 6, optical received powers are varied in the channels in the receiving link due to the variation of the optical outputs of the light emission devices, the variation of the characteristics of the optical connecting system, the variation of transmission loss and the like. Considering performance of the present devices, a dynamic range of at least 10 dB is required for an optical receiving link used in the optical parallel transmission system.

In the optical parallel transmission system into which the fixed threshold method is adopted, the structures of circuits are simple and burst signals can be processed. However, since the reference voltage used for the limit amplifiers is fixed, if the level of the optical received signal becomes large, there is a case where a background noise in the extinction state is erroneously recognized as a light emitting state (corresponding, for example, a "H" level). Thus, the receiving dynamic range is limited. Assuming that the extinction ratio is large enough and the recognition level (the reference level) is set at an optimum level (abound one half as large as the amplitude) in the minimum level receiving case, a relationship between the dynamic range D (dB) of the optical parallel transmission system into which the fixed threshold method is adopted and the ratio x (%) of the noise level to the amplitude of the signal is represented by the following formula.

$$D=10 \log (100/2x) \tag{1}$$

According to the above formula, when the ratio x of the noise level to the amplitude of the signal is 10% (x=10), the dynamic range D is limited to about 7 dB (D=7 dB).

A description will now be given, with reference to FIGS. 18A and 18B, of the limitation of the dynamic range in the optical receiving link.

Figures 18A, 18B:
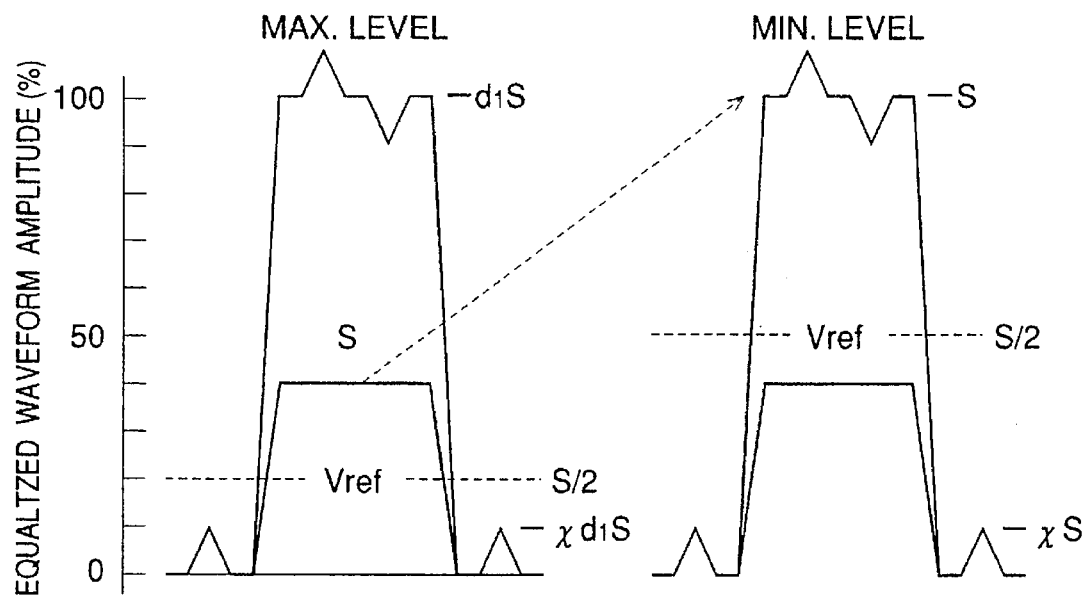
FIG. 18A is a waveform diagram illustrating received signals in the maximum level receiving case.
FIG. 18B is a waveform diagram illustrating received signals in the minimum level receiving case.

FIG. 18A shows an output waveform of the pre-amplifier in the maximum level receiving case in comparison with an output waveform in the minimum level receiving case. FIG. 18B shows an enlarged output waveform of the pre-amplifier in the minimum level receiving case. In FIGS. 18A and 18B, the output waveform in the minimum level receiving case has a signal amplitude S and a noise amplitude $\chi S$ in the extinction state, where $\chi$ is a ratio of the noise amplitude to the signal amplitude. In addition, the output waveform in the maximum level receiving case has a signal amplitude $d_1 S$ and a noise amplitude $\chi d_1 S$ in the extinction state, where $d_1$ is the dynamic range. The reference level $V_{ref}$ (the fixed threshold level) is set at a level S/2 which is one half as large as the signal amplitude S in the minimum level receiving case. In this case, it is assumed that an ideal differential amplifier connected to the pre-amplifier so that a recognition indefinite width is "0". A critical condition under which a recognition error occurs is that the noise amplitude $\chi d_1 S$ in the maximum level receiving case reaches the reference level $V_{ref}$. That is the critical condition is represented by the following formula.

$$\chi d_1 S = S/2 \tag{2}$$

The above formula (1) is led from the formula (2).

Considering circuit noises, cross talk noises from other channels and waveform distortion, it is actually difficult to estimate the ratio of the noise amplitude to the signal amplitude at 10%. Specifically, the higher the speed of the signals to be processed, the larger the noise amplitude. Thus, the noise causes the limitation of the transmission speed. The signal amplitude S may be theoretically reduced until the noise amplitude $((1-\chi)S)$ in the light-emission state in the minimum level receiving case reaches the reference level $V_{ref}$. However, considering off-set caused by temperature drift and characteristic variation among circuit elements, the reference revel $V_{ref}$ (the recognition level) is set at a level which is one half as large as the signal amplitude S in the minimum level receiving case.

Since the reference level $V_{ref}$ is fixed (the fixed threshold method), the dynamic range of the received signal (the output of the pre-amplifier) in the optical parallel transmission system depends on variation of characteristics of optical elements, optical connecting systems, transmission paths, circuit elements in every lot (an absolute variation). For example, the variation of characteristics of semiconductor devices among wafers affects the dynamic range of the received signal. Although the variation of characteristics of circuit elements in a semiconductor device (e.g. an LSI) (a relative variation) can be small, it is difficult to reduce the variation (the absolute variation) of the characteristics of semiconductor devices among wafers. Thus, to satisfy the condition of the dynamic range of the received signal based on the output signal (the ratio of the noise amplitude to the signal amplitude is $\chi$) of the pre-amplifier, described above, the production yield of devices, such as the semiconductor devices, are greatly reduced.

Thus, in the fourth embodiment of the present invention will be described below, the dynamic range of the received signal are substantially expanded.

Figure 19:
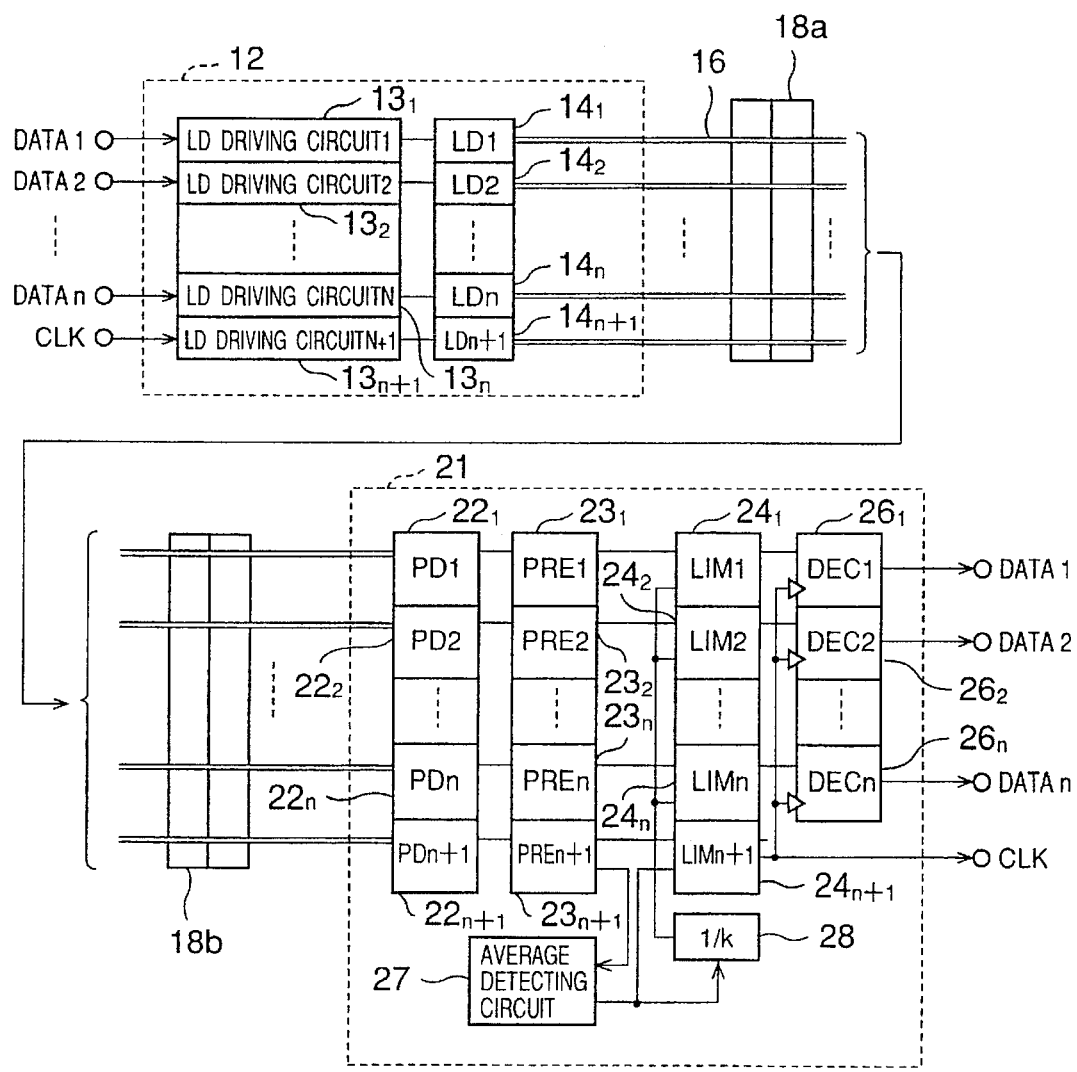
FIG. 19 is a block diagram illustrating an optical parallel transmission system according to a fourth embodiment of the present invention.

FIG. 19 shows an optical parallel transmission system according to the fourth embodiment of the present invention. In FIG. 19, those parts which are the same as those shown in FIG. 6 are given the same reference numbers.

Referring to FIG. 19, the transmission link 12 and the receiving link 21 are connected by the optical fiber array 16 provided with optical connectors 18a and 18b. In the clock channel (n+1) assigned to the clock, the output signal of the pre-amplifier $23_{n+1}$ is supplied to an average detecting circuit 27, in the same manner as in the third embodiment shown in FIG. 16. The average detecting circuit 27 detects an average level of the output signal of the pre-amplifier 23n+1 and outputs a detecting signal having the detected level. The detecting signal from the average detecting circuit 27 is supplied, as the reference level $V_{ref}$ to the limiter amplifier $24_{n+1}$ in the clock channel (n+1). The limiter amplifier 24n+1 generates the clock CLK based on the reference level $V_{ref}$. The clock CLK generated by the limiter amplifier $24_{n+1}$ is supplied to the data decision circuits $26_1$–$26_n$ in the respective data channels.

As has been described above, in the clock channel, the received signal (the output of the pre-amplifier) is converted into a binary signal having a constant amplitude, using the average level of the received signal as the reference level. As a result, the clock CLK generated by the limiter amplifier $24_{n+1}$ has a duty ratio close to 50%.

The detecting signal from the average detecting circuit is supplied to a constant multiplier 28. The constant multiplier 28 multiplies a constant 1/k by the detecting signal, and supplies the multiplying result to the limiter amplifiers $24_1$–$24_n$ in the respective data channels as the reference level (the threshold level). the signal output as the multiplying result from the constant multiplier 28 has a level obtained by multiplying the average level of the clock from the pre-amplifier $23_{n+1}$ and the constant 1/k.

Figures 20A, 20B:
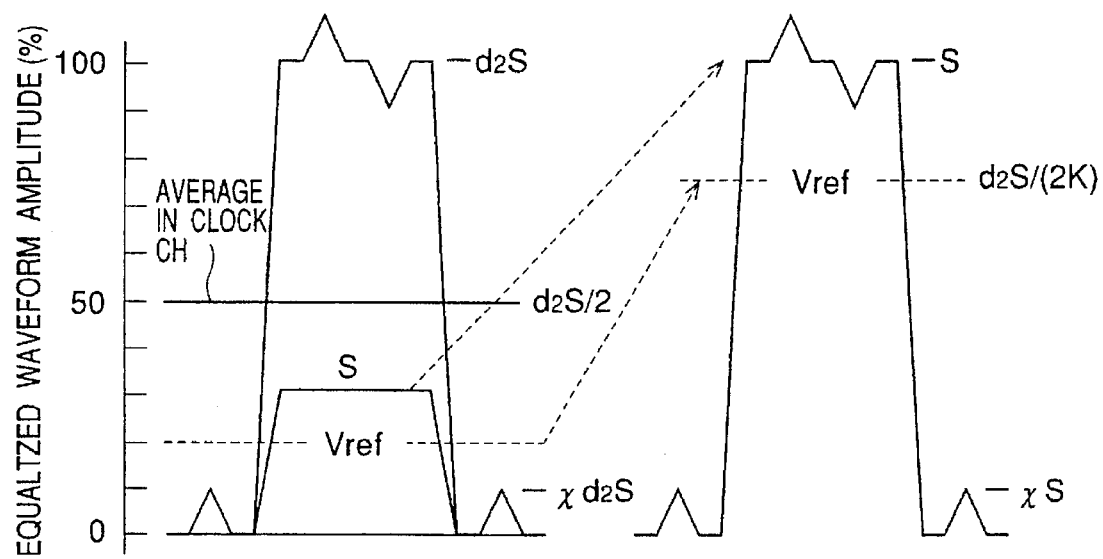
FIGS. 20A and 20B are waveform diagrams illustrating received signals and a threshold level used in each of limiter amplifiers.
Figures 21A, 21B:
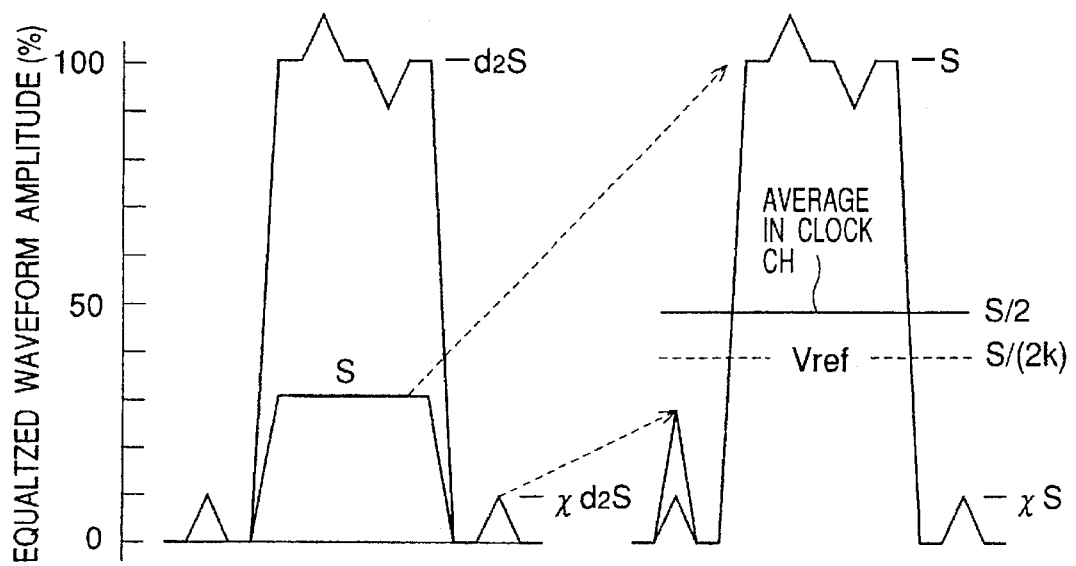
FIGS. 21A and 21B are waveform diagram illustrating received signals and a threshold level used in each of the limiter amplifiers.

A relationship between the output of the pre-amplifier in each data channel and the reference level $V_{ref}$ is shown in FIGS. 20A, 20B, 21A and 21B. FIG. 20A shows the signal level in the clock channel which is in the maximum level receiving case and the signal level in a data channel which is in the minimum level receiving case. FIG. 20B shows the enlarged signal level in the data channel which is in the minimum level receiving case. FIG. 21A shows the signal level in the clock channel which is in the minimum level receiving case and the signal level in a data channel which is in the maximum level receiving case. FIG. 21B shows the enlarged signal level in the clock channel which is in the minimum level receiving case.

Referring to FIGS. 20A and 20B, the result (the level of the detecting signal) of the average detecting operation in the maximum level receiving case is equal to $d_2S/2$. Thus, the level of the signal output from the constant multiplier 28, which level is used as the reference revel $V_{ref}$, is equal to $d_2S/(2k)$. At this time, in a data channel which is in the minimum level receiving case, if the reference level ($d_2S/(2k)$) is greater than the noise amplitude $(1-\chi)S$ in the light emission state (the "H" level), an code error occurs (see FIG. 20B). That is, a critical condition under which the code error occurs is represented by the following formula.

$$(1-\chi)S=d_2S/(2k) \qquad (3)$$

Referring to FIGS. 21A and 21B, the result of the average detecting operation (the level of the detecting signal) in the minimum level receiving case is equal to S/2. Thus, the level of the signal output from the constant multiplier 28, which level is used as the reference level $V_{ref}$ is equal to $S/(2k)$. At this time, in a data channel which is in the maximum level receiving case, if the reference level $(S/(2k))$ is less than the noise amplitude $\chi d_2 S$ in the extinction state (the "L" level), a code error occurs (see FIG. 21B). That is, a critical condition under which the code error occurs is represented by the following formula.

$$\chi d_2 S = S/(2k) \qquad (4)$$

The simultaneous equation of the above formulas (3) and (4) is solved, so that the following solution is obtained.

$$1/k = 2\sqrt{(1-\chi)/\chi} \qquad (5)$$

Thus, the constant 1/k used in the constant multiplier 28 is decided, using the ratio $\chi$ of the noise amplitude to the signal amplitude, in accordance with the formula (5).

In addition, the above formulas (3) and (4) are solved with respect to the dynamic range $d_2$, so that the following solution is obtained.

$$d2 = \sqrt{(1-\chi)/\chi} \qquad (6)$$

For example, in a case of $\chi=10\%$, the dynamic range is 5 dB and the reference level $V_{ref}$ is set to a level as 0.6 (60%) as large as the average level of the clock.

Figure 22:
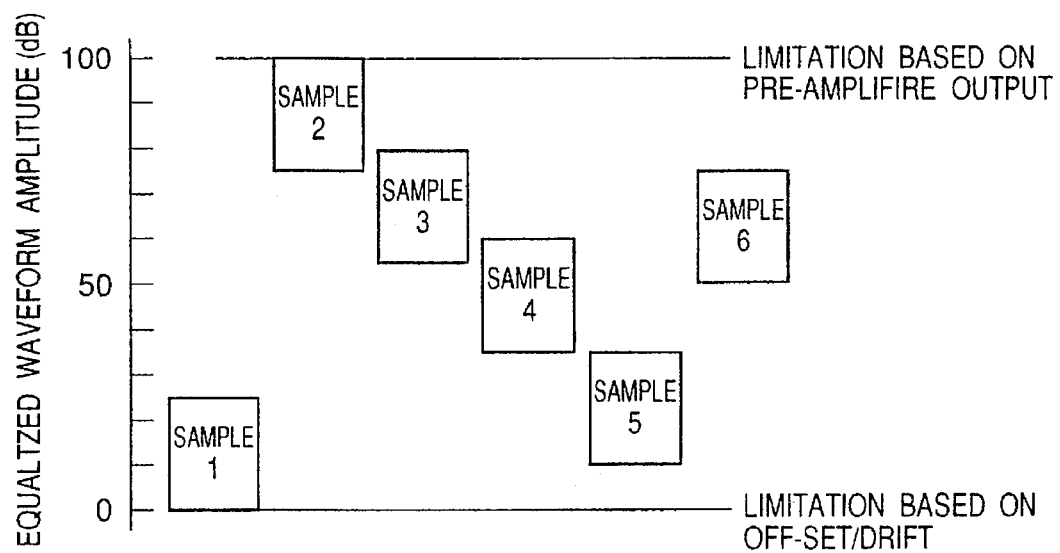
FIG. 22 is a diagram illustrating limitation of a dynamic range.

In the above embodiment, the laser diode driving circuits $13_1$–$13_{n+1}$ in the transmission link 12 are formed as a signal monolithic integrated circuit and the laser diodes $14_1$–$14_{n+1}$ are formed as a laser diode array. The pre-amplifiers $23_1$–$23_{n+1}$ in the receiving link 21 are formed as a single monolithic integrated circuit and photo-diodes $22_1$–$22_{n+1}$ are formed as a photo-diode array. In this case, the respective data channels and the clock channel have similar characteristics and the variation of the characteristics is small. That is, even if allowed dynamic range of the received signal is 5 dB, the correct code determination can be provided Further, even if there is a large variation (the absolute variation) of the characteristics among lots of electric elements, the correct code determination can be provided if the variation (the relative variation) among elements in each lot is small. For example, as shown in FIG. 22, even if the variation of the levels of the received signals in all samples 1–6 is 20 dB (from a minimum level in the sample 1 to a maximum level in the sample 6), the correct code determination can be provided if the variation of the levels of the received signals in each sample is equal to or less than 5 dB (in each square shown in FIG. 22). Thus, in the present invention, the allowed dynamic range of the receiving signal can be substantially expanded from the conventional dynamic range (e.g. from 7 db to 20 dB).

A description will now be given, with reference to FIGS. 23, 24A and 24B, of a fifth embodiment of the present invention.

Figure 23:
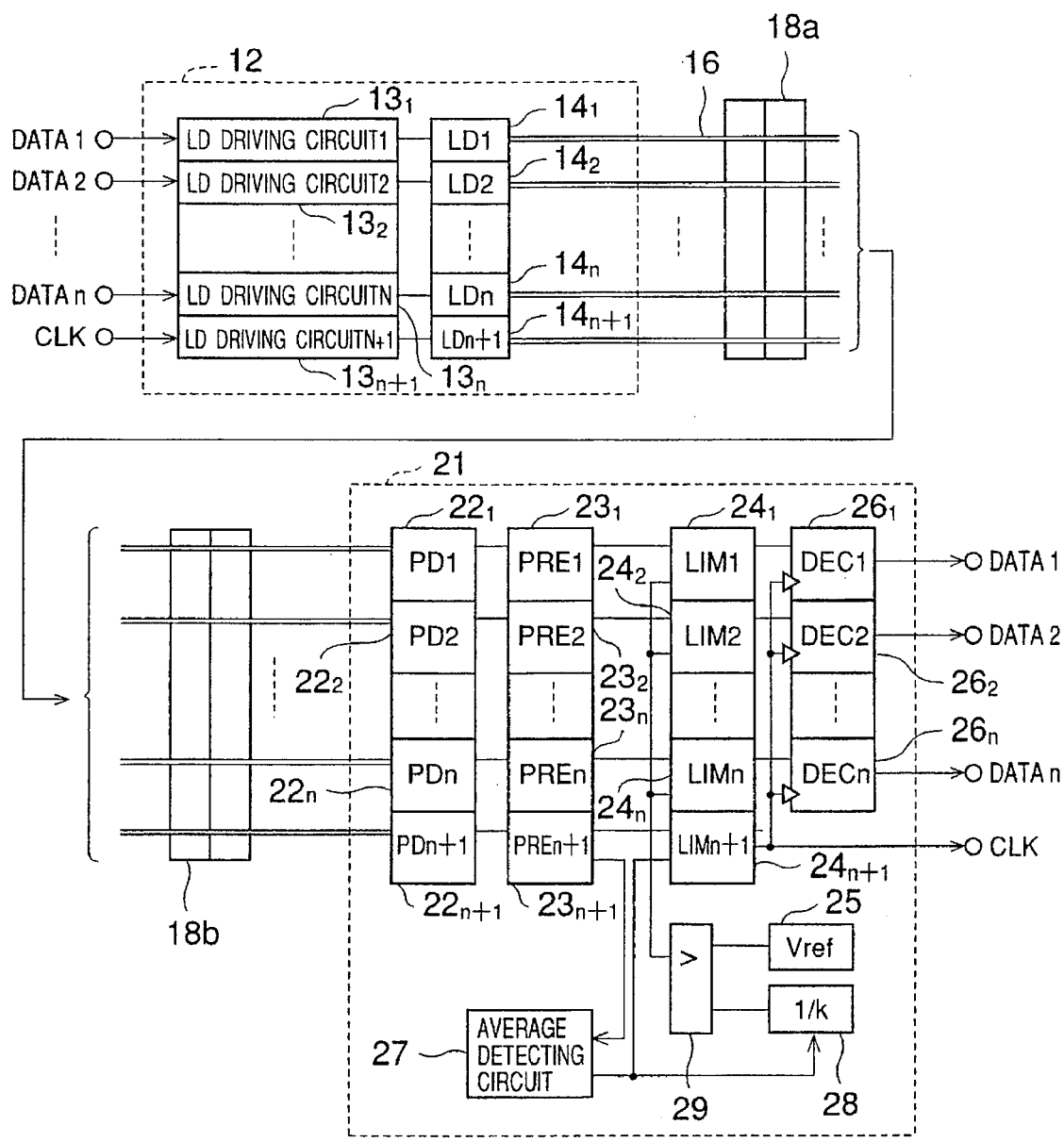
FIG. 23 is a block diagram illustrating an optical parallel transmission system according to a fifth embodiment of the present invention.
Figure 24:
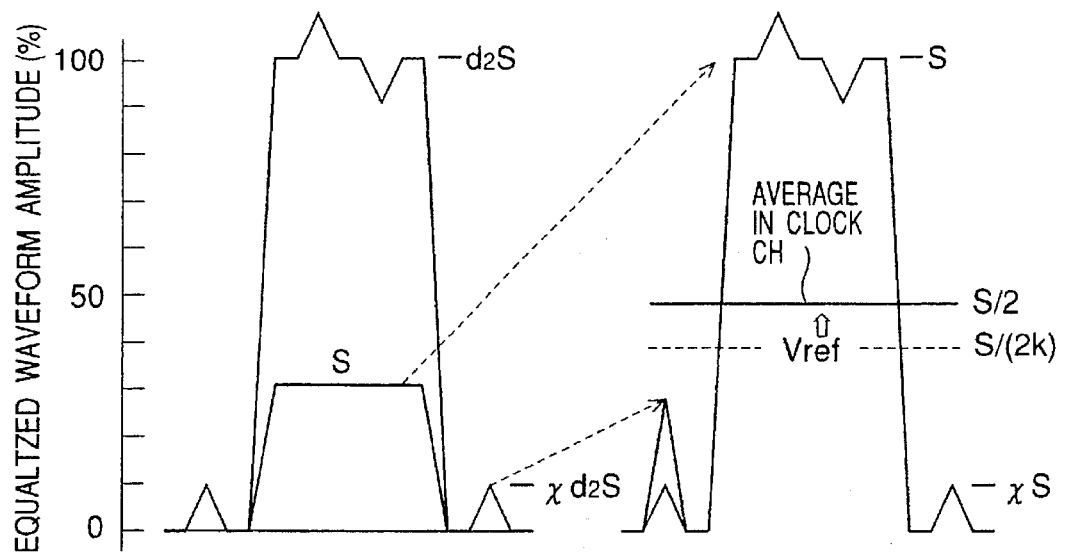
FIGS. 24A and 24B are waveform diagrams illustrating received signals and a threshold level used in each of the limiter amplifiers.

FIG. 23 shows an optical parallel transmission system according the fifth embodiment of the present invention. In FIG. 23, those parts which are the same as those shown in FIG. 19 are given the same reference numbers.

Referring to FIG. 23, the transmission link 12 has the laser diode driving circuits $13_1$–$13_{n+1}$ and the laser diodes $14_1$–$14_{n+1}$ in the same manner as that in the previous embodiment. In addition, the receiving link 21 has photo-diodes $22_1$–$22_{n+1}$, the pre-amplifiers $23_1$–$23_{n+1}$, limiter amplifiers $24_1$–$24_{n+1}$ and the data decision circuits $26_1$–$26_n$. The transmission link 12 and the receiving link 21 are connected by the fiber array 16.

The receiving link 21 further has the average detecting circuit 27, the constant multiplier 28 and a selecting circuit 29. The average detecting circuit 27 and the constant multiplier 28 has the same function as those shown in FIG. 19, so that the constant multiplier 28 outputs the signal having the level obtained by multiplying the average level of the signal in the clock channel and the constant 1/k. The constant 1/k is decided in accordance with the formula (5). The reference circuit 25 outputs the signal having the fixed reference level $V_{ref}$ (S/2) which is one half as large as the signal level in the minimum level receiving case. The selecting circuit 29 selects either the signal from the constant multiplier 28 or the signal having the reference level $V_{ref}$ from the reference circuit 25, which ever is greater. The signal selected by the selecting circuit 29 is supplied, as a threshold level, to the limiter amplifiers $24_1$–$24_n$.

In the fifth embodiment, a greater one of the fixed reference level $V_{ref}$ and the level obtained by multiplying the average level of the clock is supplied, as the threshold level, to the limiter amplifiers $24_1$–$24_n$. Thus, when the clock channel is in the maximum level receiving case, the signal from the constant multiplier 28 is supplied, as the threshold, to the limiter amplifiers $24_1$–$24_n$, in the same manner as in the fourth embodiment describe above. On the other hand, when the clock channel is in the minimum level receiving case, the fixed reference level $V_{ref}$ is selected. In this case, as shown in FIGS. 24A and 24B, until the noise amplitude ($\chi d_2 S$) in the extinction state (the "L" level) in a data channel which is in the maximum level receiving case reaches the reference level $V_{ref}$ (=S/2) greater than the level of the output signal from the constant multiplier 28, an error does not occur. That is, the critical condition regarding this case is represented by the following formula.

$$\chi d_2 S = S/2 \qquad (7)$$

For example, in a case $\chi=10\%$, the dynamic range of 7 dB is obtained based on the above formula (7). As a result, the dynamic range depending on the absolute variation of the characteristics of the respective devices is expanded by 2 dB.

Now, in order to miniaturize the optical parallel transmission system, respective circuit blocks are formed as monolithic integrated circuits as described above. In this case, due to the cross talk caused by high frequency components leaked via stray capacitance, the received signals are deteriorated. Specifically, the photo-diode array and the pre-amplifiers in which infinitesimal signals are provided are affected by the cross talk.

In a sixth embodiment, the cross talk from the clock channel to a data channel is reduced.

Figure 25:
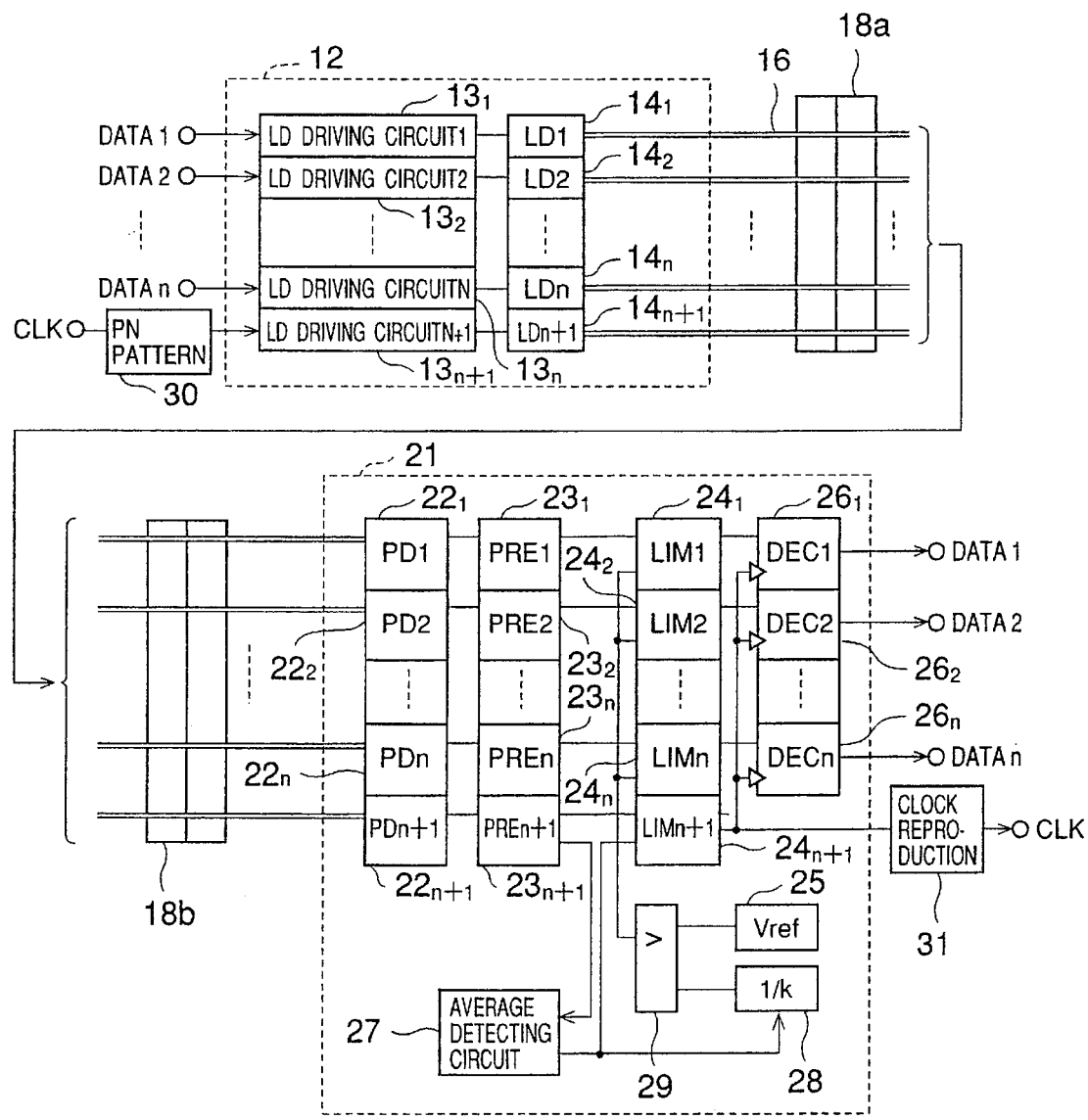
FIG. 25 is a block diagram illustrating an optical parallel transmission system according to a sixth embodiment of the present invention.

FIG. 25 shows an optical parallel transmission system according to the sixth embodiment. In FIG. 25, those parts which are the same as those shown in FIG. 19 are given the same reference numbers.

Referring to FIG. 25, a PN pattern generator 30 is provided in a prior stage of the transmission link 12. The PN pattern generator 30 generates a pseudo random pattern based on a clock supplied from an external unit. In the clock channel, the laser diode driver circuit $13_{n+1}$ drives the laser diode $14_{n+1}$ based on the pseudo random pattern from the PN pattern generator 30. An optical signal corresponding to the pseudo random pattern transmitted from the transmission link 12 to the receiving link 21 via the optical fiber. In the receiving link 21, the signal corresponding to the pseudo random pattern is converted into electric signal by the photo-diode $22_{n+1}$, and the electric signal is processed by the pre-amplifier $23_{n+1}$. The average detecting circuit 27 detects an average level of the received signal (the output of the pre-amplifier) corresponding to the pseudo random pattern. The limiter amplifiers $24_1$–$24_{n+1}$ and the data decision circuits $26_1$–$26_n$ are operated in the same manner as those in the above fifth embodiment. A clock reproducing circuit 31 is provides at the tail of the receiving link 21. The clock reproducing circuit 31 reproduce the clock based on the output signal of the limiter amplifier $24_{n+1}$.

According to the sixth embodiment, since the pseudo random pattern is transmitted in the clock channel, the cross talk from the clock channel to another data channel is reduced.

In a case where the receiving link 21 of the optical parallel transmission system formed in a monolithic integrated circuit (LSI), a capacitor element used in the average detecting circuit 27 (e.g. a smoothing circuit) must be mounted in the integrated circuit. At present, a capacitance of a capacitor element which can be formed in an LSI is limited to a few tens pico-farads (pF) order. Thus, when the transmission speed is lowered, it is difficult to form a capacitor element having a suitable capacitance in an LSI.

Figure 26:
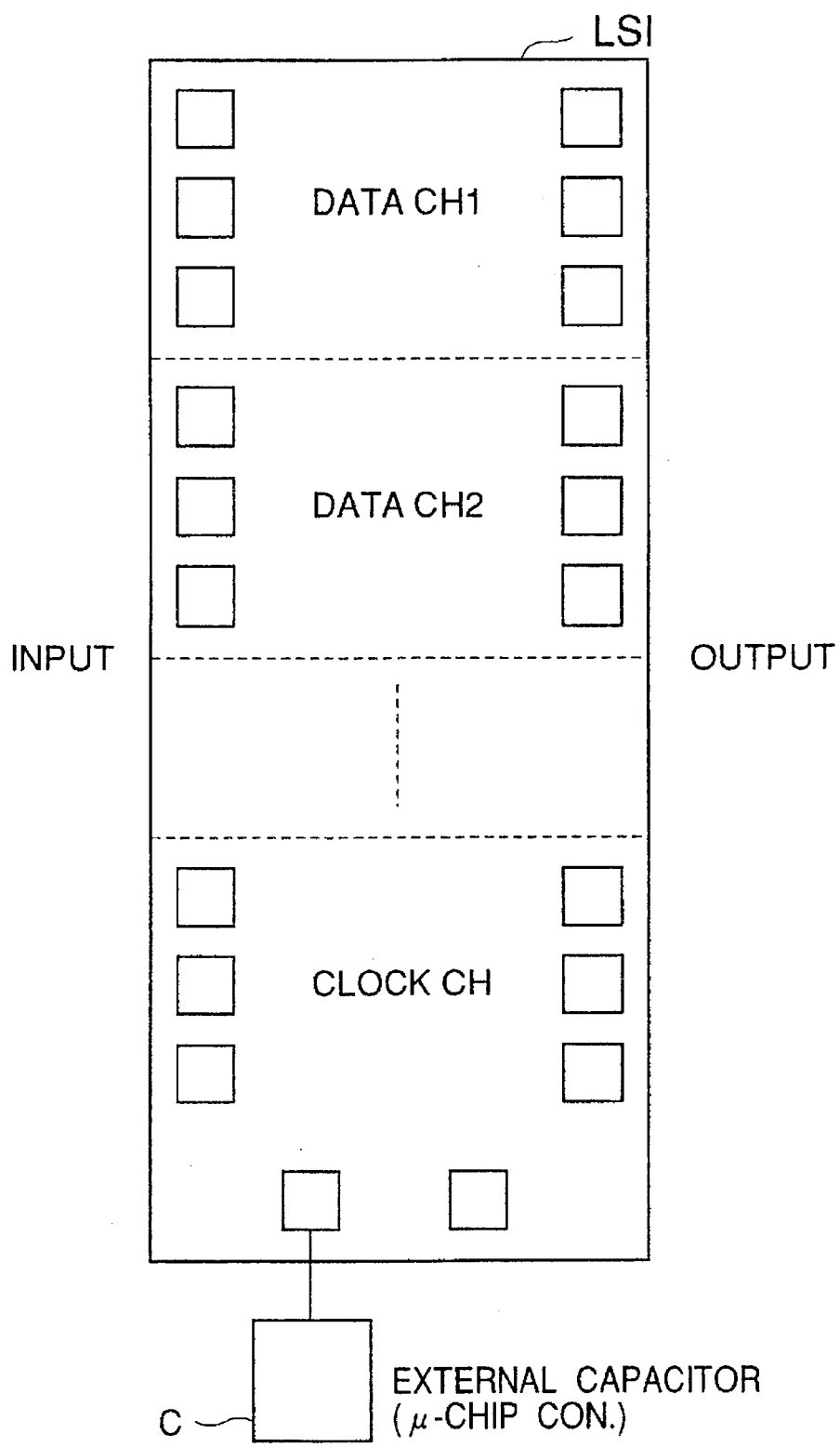
FIG. 26 is a diagram illustrating an arrangement of channels in a receiving ling formed as an LSI which is used in an optical parallel transmission system.

In a seventh embodiment, a capacitor element C used in the average detecting circuit 27 is provided, as an external element, in the outside of the LSI (the monolithic integrated circuit) in which the respective channels are formed, as shown in FIG. 26. This capacitor element C which is the external element is connected to the clock channel in the LSI. In addition, in the LSI in which the receiving link 21 is formed, the clock channel is located at an edge portion of the LSI. Thus, the capacitor element C can be easily connected to the clock channel.

Further, in the above embodiments, the constant multiplier 28 (1/k) and the selecting circuit 29 are formed in the LSI. However, since the clock is always transmitted and responses may have DC levels, these circuits may be formed as an external operating circuit.

In the optical parallel transmission system as described above, the transmission link 12 and the receiving link 21 are connected by the array fiber 16 formed of a plurality of optical fibers. A structure of a coupling terminal (a ferrule) coupling the array fiber 16 to each optical link (the transmission link or th receiving link) is an important device in that high communication quality is maintained in the optical parallel transmission system.

In general, the following technique has been known as a technique by which many optical fibers are arranged. That is, a plurality of grooves are formed on a silicon block by an etching process so as to be arranged at predetermined intervals, each of the grooves having a V-shaped cross section (V-shaped grooves). Optical fibers are set in the respective grooves. However, a technique by which the optical fibers arranged in accordance with the above technique are fixed with a high reliability has not yet been established. Although it has been proposed that the optical fibers set in the respective V-shaped grooves are fixed using solder, this fixed structure has not yet have a sufficient reliability.

The terminal of the array fiber must be firmly fixed to each link module.

Thus, in the next embodiment, the terminal structure of the array fiber having a sufficient reliability.

Figure 27:
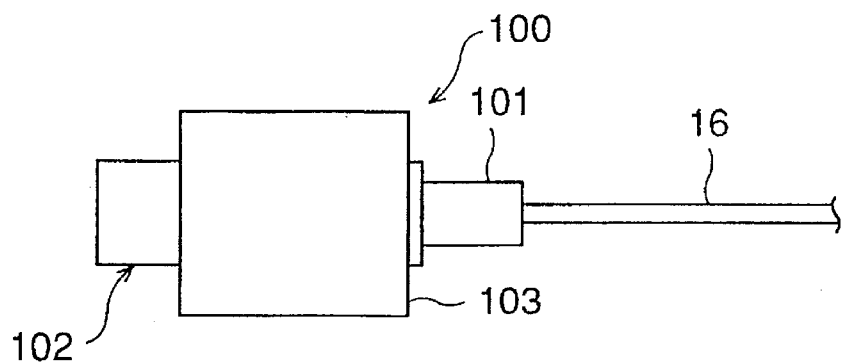
FIG. 27 is a diagram illustrating an exterior view of a ferrule provided at an end of a fiber array.
Figure 28:
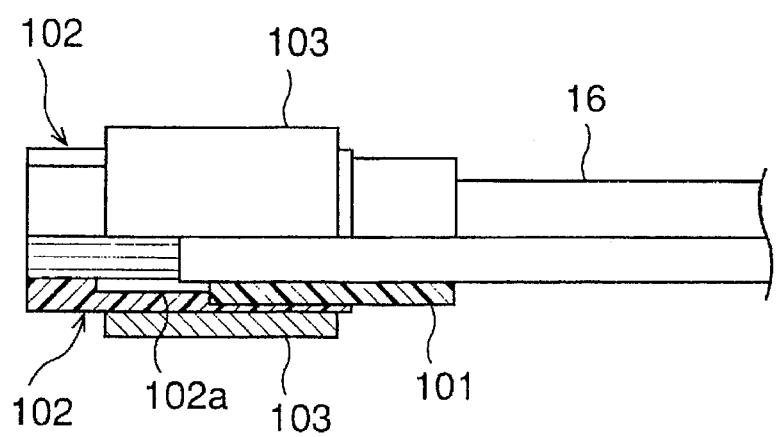
FIG. 28 is a longitudinal cross sectional view illustrating the ferrule shown in FIG. 27.
Figure 29:
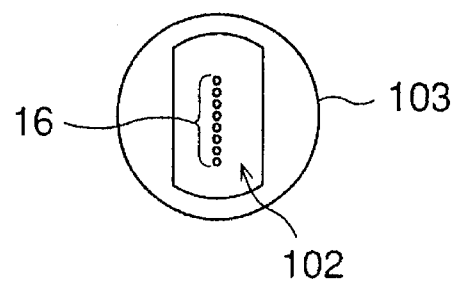
FIG. 29 is an end view showing the ferrule.

FIG. 27 shows an exterior view of a ferrule 100 fixed on an end of the array fiber 16 and connected to the transmission link 12 or the receiving link 21. FIG. 28 shows a partial cross sectional view of the ferrule 100. FIG. 29 shows an end surface of the ferrule.

An arrangement of fibers and a fixed structure of the fibers in a plastic connector known as an optical coupling device is utilized for the ferrule 100 shown in FIGS. 27, 28 and 29. A structure formed as the known plastic connector is inserted into a cylindrical mounting member 103 made of metal (e.g. stainless steel). In the structure formed as the know plastic connector, a portion close to an end of the multi-tape-fiber 16 which is coated with nylon is covered with a supporting member 101 made of rubber. The supporting member 101 is inserted in a fiber arrangement member 102 made of plastic. Fibers projecting from an end of the nylon coated portion of the multi-tape-fiber 16 are arranged in a line by the fiber arrangement member 102. A cavity in the fiber arrangement member 102 is filled with adhesive (epoxy resin adhesive), so that the respective fibers are fixed in the fiber arrangement member 102. An end surface of the fiber arrangement member 103 projects from an end surface of the cylindrical mounting member 103 made of metal.

The known plastic connector is utilized for the above arrangement and fixing structure of fibers, so that the structure has a sufficient reliability. In addition, since the end surface of the fiber arrangement member 102 made of plastic projects from the end surface of the cylindrical mounting member 103 made of metal, it is easy to grind the end surface of the fiber arrangement member 102 made of plastic. That is, the ferrule 100 has a high workability.

The fiber arrangement member 102 may be adhered to the cylindrical mounting member 103 by the epoxy resin adhesive.

Figure 30:
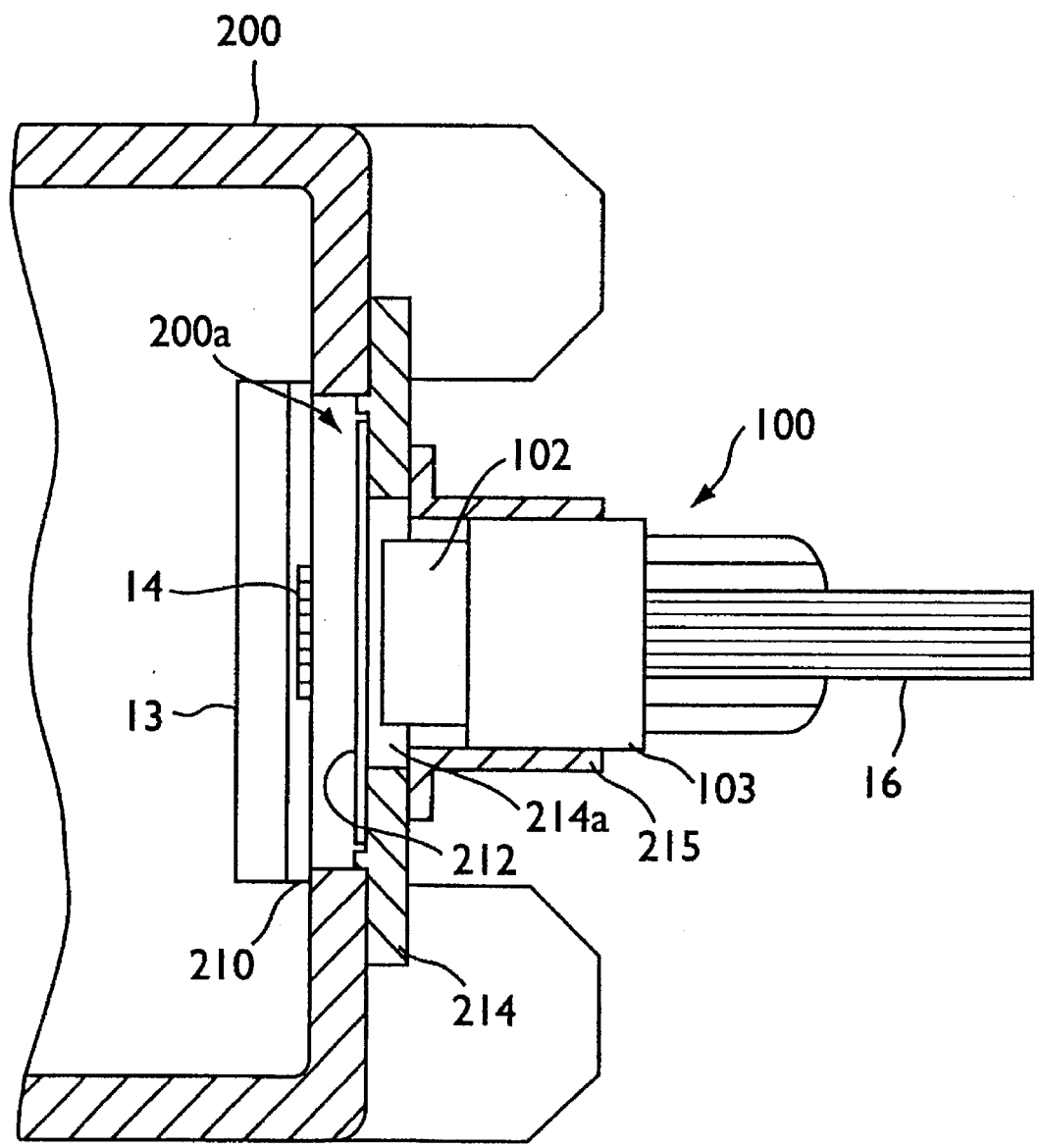
FIG. 30 is a horizontal cross sectional view illustrating a structure in which the ferrule shown in FIG. 27 is mounted on a housing of a module.
Figure 31:
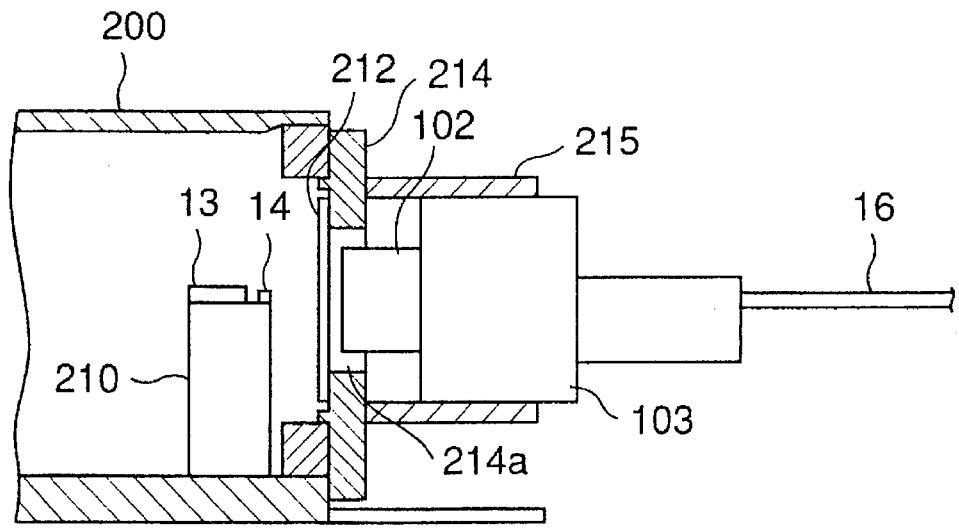
FIG. 31 is a longitudinal cross sectional view illustrating a structure in which the ferrule shown in FIG. 27 is mounted on a housing of a module.

The ferrule 100 having the above structure is mounted on a housing 200 (e.g. a housing of the transmission link module) as shown in FIGS. 30 and 31. FIG. 30 shows a horizontal cross sectional view of a connecting structure between the housing 200 and the ferrule 100, and FIG. 31 shows a longitudinal cross sectional view of the connecting structure.

Referring to FIGS. 30 and 31, in the housing 200, the laser diode array 14 and the laser diode driving circuit 13 mounted on a supporting block 210 are housed so as to face an opening 200a formed on a wall of the housing 200. A mounting ring 214 made of metal is fixed aground the opening 200a of the housing 200. A glass plate 212 is fixed on the mounting ring 214 by the adhesive so as to cover the opening 214a. A sleeve 215, made of metal, having a flange formed on an end thereof is coaxingly welded together the mounting ring 214.

The ferrule 100 is inserted into the sleeve 215, and a relative position of the array fiber in the ferrule to the laser diode array 14 is adjusted by rotation and longitudinal movement of the ferrule 100. The ferrule 100 is then positioned at an optimum position and the cylindrical mounting member 103 of the ferrule 100 is welded together the sleeve 215.

As has been described above, in the present embodiment, since the ferrule 100 is welded to the housing 200, the laser diode array 14 and the array fiber are optically coupled at a high reliability.

In addition, since the end surface of the fiber arrangement member 102 projects from the end surface of the cylindrical mounting member 103 directly welded to the sleeve 215, the end surface of the array fiber can be further closer to the laser diode array 14 than a position at which the ferrule 100 is fixed on the sleeve 215.

Modifications of the ferrule 100 are shown in FIGS. 32–36.

Figure 32:
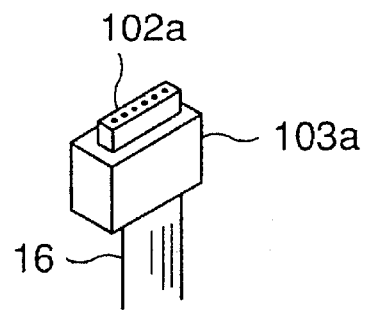
FIGS. 32, 33, 34, 35 and 36 are perspective views showing examples of structures of the ferrule.
Figure 33:
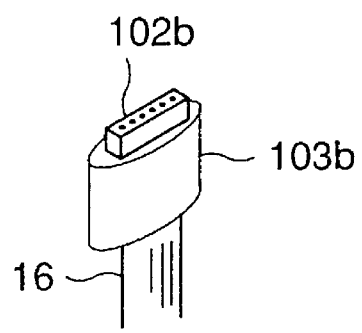
Figure 34:
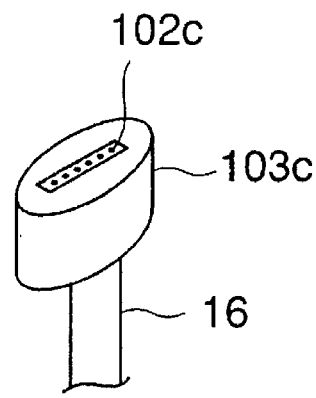

In the ferrule 100 shown in FIG. 32, a block-shaped fiber arrangement member 102a made of plastic and a block-shaped mounting member 103a made of metal are used. In the ferrule 100 shown in FIG. 33, a block-shaped fiber arrangement member 102b made of plastic and an ellipsoid-shaped mounting member 103b made of metal are used. In the ferrule shown in FIG. 34, a block-shaped fiber arrangement member 102c made of plastic and an ellipsoid-shaped mounting member 103c are used. The end surface of the block-shaped arrangement member 102c is even with (does not project from) the end surface of the ellipsoid-shaped mounting member 103c.

Figure 35:
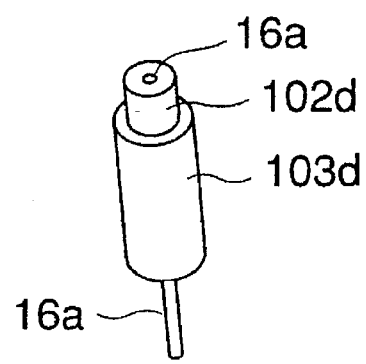

FIG. 35 shows a ferrule including a single fiber. In this modification, a fiber 16a is supported by a plastic holder 102d using the same structure as that shown in FIG. 28. The plastic holder 102d is inserted in a cylindrical mounting member 103d made of metal.

In a conventional ferrule supporting a single fiber, a capillary made of zirconia is inserted in a metal cylinder and a fiber is supported by the capillary. According to the ferrule as shown in FIG. 35, since the fiber 16a is supported by the plastic holder 102d, the workability of the ferrule is improved.

Figure 36:
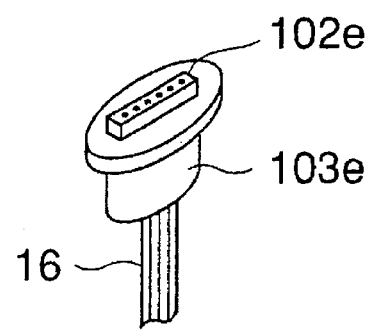

In the ferrule shown in FIG. 36, a block-shaped fiber arrangement member 102e made of plastic and an ellipsoid-shaped mounting member 103e made of metal are used. The ellipsoid-shaped mounting member 103e has a flange formed on an end thereof. The flange of the ellipsoid-shaped mounting member 103e can be directly welded together the mounting ring 214 without the sleeve 215 shown in FIG. 30 and 31, so that the ferrule can be easily mounted on the housing 200. However, in this case, a degree of freedom of adjustment of the ferrule is reduced.

In the optical parallel transmission system described above, characteristics of the laser diodes and optical coupling losses are varied in the respective channels. Due to temperature variation, the variation of the characteristics of he laser diodes and the variation of the optical coupling losses are increased. In the next embodiment, even if the characteristics of the laser diodes and the optical coupling losses are varied in the channels, the received signals in the respective channels can have a uniform level.

Figure 37:
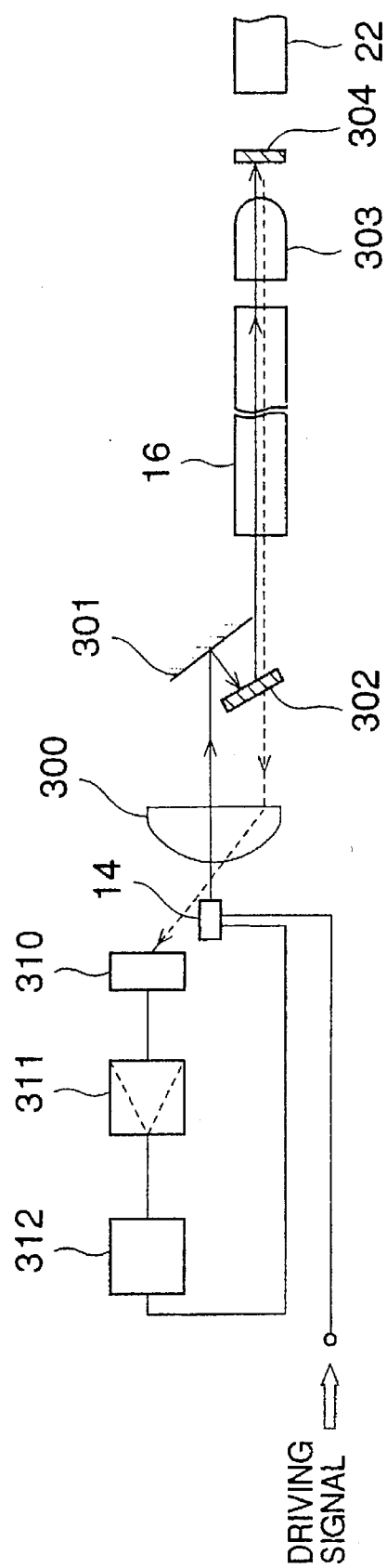
FIG. 37 is a diagram illustrating a structure of each channel of an optical parallel transmission system according to an embodiment of the present invention.

FIG. 37 shows an optical transmission system in each channel. Referring to FIG. 37, a laser beam emitted from the laser diode 14 (the laser diode array) travels to the fiber 16 (the array fiber) via a lens 300 (a lens array), a mirror 301 and a semi-transparent mirror 302. The laser beam then travels through the fiber 16 to the receiving link 21. A lens 303 (a lens array) provided in the receiving link 21 focuses the laser beam emitted from the fiber 16 on a reflection/transmission control unit 304 put between the lens 303 and the photo-diode 22 (the photo-diode array). The reflection/transmission control unit 304 has a structure in by which a reflecting mode and a transmission mode are switched from one to another, as will be described later. In the reflection mode, incident light is reflected by the reflection/transmission control unit 304. In the transmission mode, the incident light is transmitted through the reflection/transmission control unit 304.

Under a condition in which the reflection/transmission control unit 304 is maintained in the reflection mode, the laser beam reflected by the reflection/transmission control unit 304 returns to the semi-transparent mirror 302 via the lens 303 and fiber 16. A component of the laser beam which component is transmitted through the semi-transparent mirror 302 is further focused on a photo-diode 310 (a photo-diode array) by the lens 300. The photo-diode 310 outputs a detecting signal having a level corresponding to an amount of light incident to the photo-diode 310. The detecting signal is supplied from the photo-diode 310 to an operating circuit 312 via an amplifier (an amplifier array). The operating circuit 312 has a structure will be described later and supplies a control signal to the laser diode 14 so that the detecting signals in the respective channels are even with each other.

Figure 38:
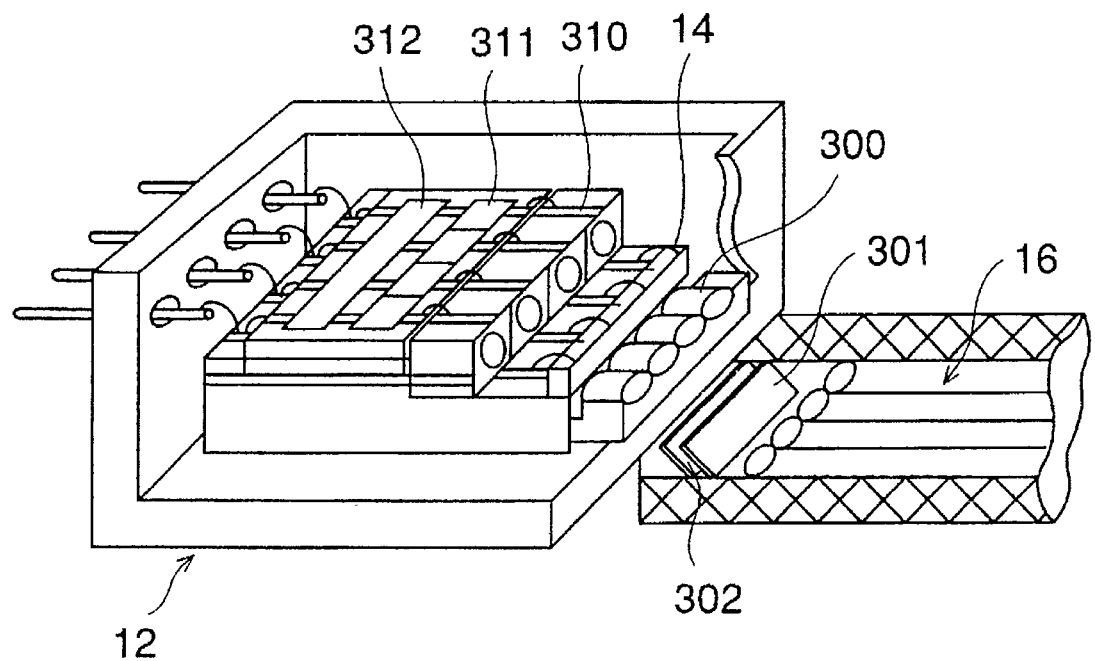
FIG. 38 is a diagram illustrating structures of a transmission link and a array fiber connected thereto in the optical parallel transmission system.

The photo-diode 310, the amplifier 311, laser diode 14 and the lens 300 are formed in an array having parts corresponding to the respective channel. The array is mounted in the transmission link 12 as shown in FIG. 38. A module into which the array fiber 16, the mirror 301 and the semi-transparent mirror 302 are integrated is optically coupled to the transmission link 12.

Figure 39:
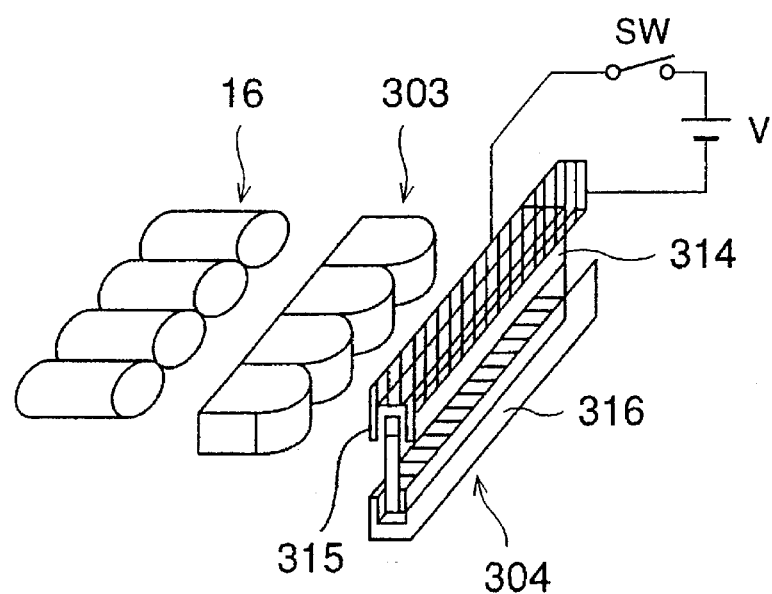
FIG. 39 is a diagram illustrating a structure of a reflection/transmission control unit.
Figure 40:
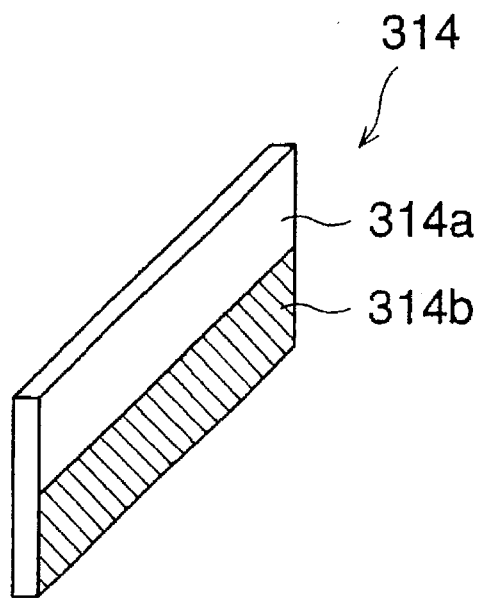
FIG. 40 is a perspective view showing a reflection/transmission plate used in the reflection/transmission control unit shown in FIG. 39.

The reflection/transmission control unit 304 is formed, for example, as shown in FIG. 39. Referring to FIG. 39, a reflection/transmission plate 314 is supported by a guide 316. The reflection/transmission plate 314 goes up and down by a driving mechanism 315. The reflection/transmission plate 314 has a transmission portion 314a and a reflection portion 314b which are arranged up and down as shown in FIG. 40. The transmission portion 314 is a portion through which light is transmitted, and the reflection portion 314b is a portion by which the light is reflected. The driving mechanism 315 is connected to a power supply V1 via a switch SW. When the switch SW is in an on-state, the reflection/transmission plate 314 is driven by the driving mechanism 315 so as to go up to a position at which the reflection portion 314b faces the lens 303. On the other hand, when the switch SW is in an off-sate, the reflection/transmission plate 315 is driven by the driving mechanism 315 so as to go down to a position at which the transmission portion 314a faces the lens 303.

Figure 44:
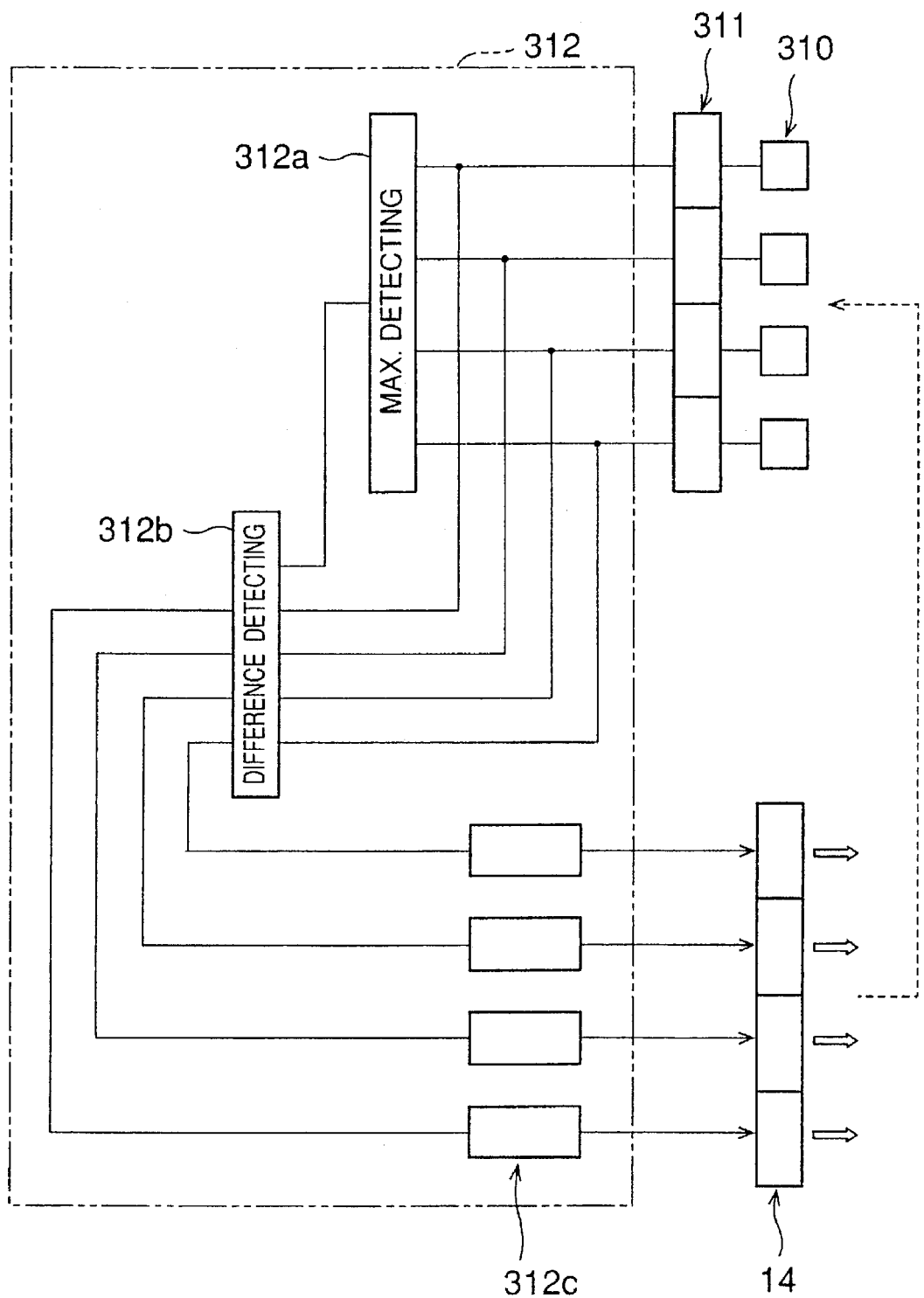
FIG. 44 is a block diagram illustrating an operating circuit in the optical parallel transmission system.

The operating circuit 312 is formed, for example, as shown in FIG. 44. Referring to FIG. 44, the operating circuit 312 has a maximum level detecting circuit 312a, a difference detecting circuit 312b and driving control circuits 312c. The laser beam emitted from the laser diode 14 is reflected by the reflection portion 314b of the reflection/transmission plate 314. An output signal from the photo diode 310 by which the reflected light is received as monitor light is supplied to the maximum level detecting circuit 312a via the amplifier 311. The maximum level detecting circuit 312a detects a maximum level of output levels from the photo diodes 310 in the respective channels. The maximum level is supplied, as a reference level, to the difference detecting circuit 312b. The difference detecting circuit 312b outputs control signals each of which depends on a difference between the reference level and a detected level (the output level of a corresponding one of the amplifiers 311) of the monitor light in a corresponding one of the channels. Each of the driving control circuits 312c controls a driving current of the laser diode 14 in a corresponding one of the channels based on a corresponding control signal. As a result, the received levels of the monitor light to the photo diodes 310 in the respective channels are even (the reference level).

In the above optical parallel transmission system, the switch SW of the reflection/transmission control unit 304 are turned on at regular intervals or every time the a transmission operation starts. Under a condition in which the reflection portion 314a of the reflection/transmission plate 314 faces the lens 303 in the optical transmission path, the driving currents for the laser diodes 14 are controlled so that the optical received levels are even in the respective channels. On the other hand, in a case where a general optical parallel transmission operation is carried out, the switch SW of the reflection/transmission control unit 304 is turned off. As a result, the reflection/transmission plate 314 is maintained in a state where the transmission portion 314b faces the lens 303 in the optical transmission path. In this state, the laser diodes 14 in the respective channels are driven using the driving currents controlled as described above, and a general optical parallel communication is carried out.

According to the optical parallel transmission system, even if the characteristics of the laser diodes 14 and the optical coupling losses in the transmission link 12 are varied among the channels, the optical received levels in the receiving link 21 can be even in the respective channels.

Figure 41:
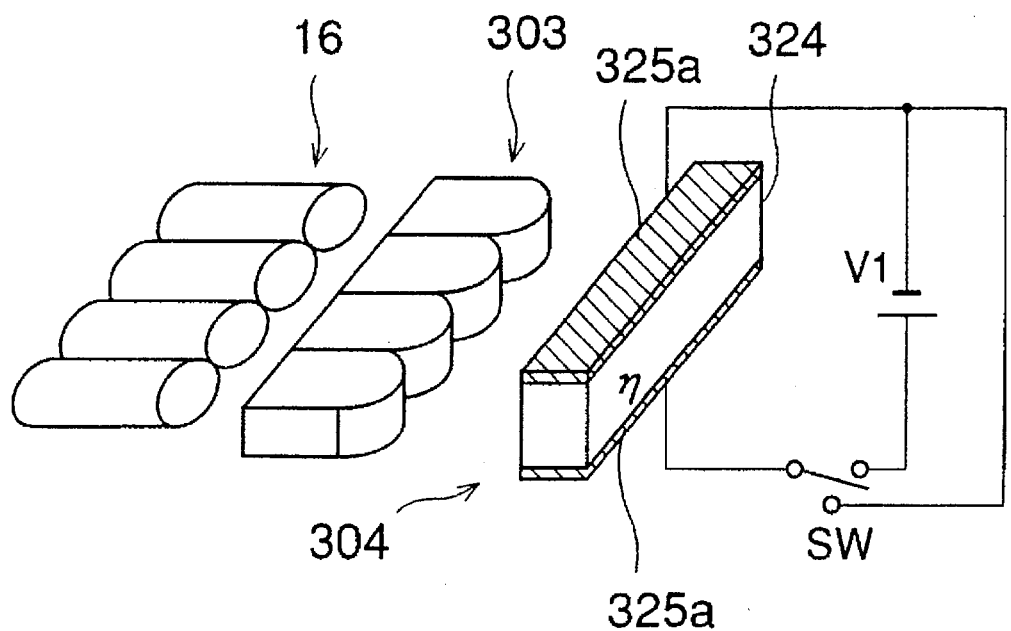
FIG. 41 is a diagram illustrating another structure of the reflection/transmission control unit.

The reflection/transmission control unit 304 may be formed as shown in FIG. 41. In this modification, ferroelectrics in which a refractive index can be controlled by an applied voltage thereto is used instead of the mechanism for switching the reflection portion 314a and transmission portion 314b to each other.

Figure 42:
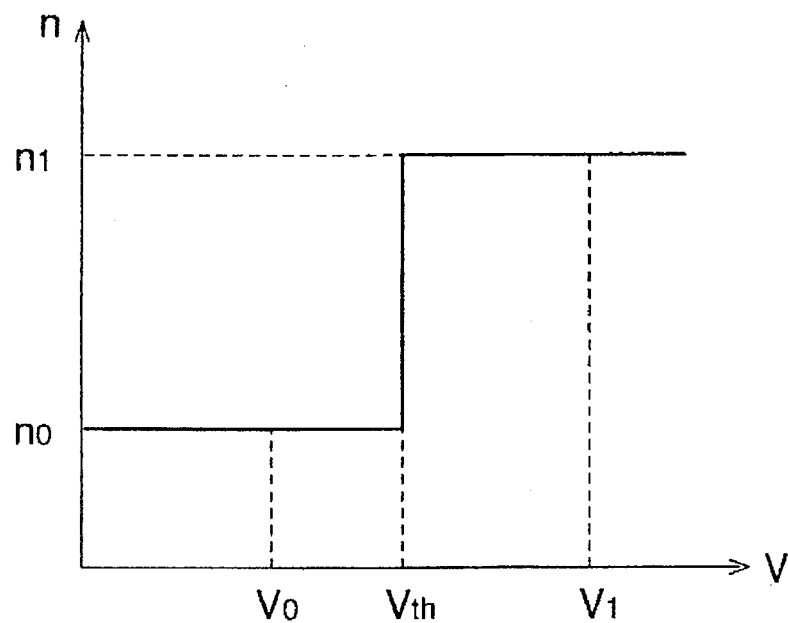
FIG. 42 is a diagram illustrating a relationship between an applied voltage and a refractive index in a ferroelectrics used in the reflection/transmission control unit shown in FIG. 41.

Referring to FIG. 41, a ferroelectric block 324 sandwiches by electrodes 325a and 325b is arranged so as to face the lens 303 in the optical transmission path. The ferroelectric block 324 is made, for example, of $LiNbO_3$ (lithium niobate). The refractive index of the ferroelectric block 324 is changed, for example, in accordance with a step function with respect to the applied voltage across the electrodes 325a and 325b as shown in FIG. 42, the step function having a step at a threshold voltage $V_{th}$. The ferroelectric block 324 is selectively applied with a first voltage $V_1$ greater than the threshold voltage Vth and a second voltage $V_0$ (e.g. 0 volt) less than the threshold voltage $V_{th}$ via a switch SW. When the first voltage $V_1$ is applied to the ferroelectric block 324, the ferroelectric block 324 has a first refractive index $n_1$. When the second voltage $V_0$ is applied to the ferroelectric block 324, the ferroelectric block 324 has a second refractive index $n_0$.

In a state where the ferroelectric block 324 has the first refractive index $n_1$, the surface of the ferroelectric block 324 is provided with a large reflectance. In this state, the driving currents of the laser diodes 14 are adjusted using the light beam reflected by the surface of the ferroelectric block 324, in the same manner as those described above. On the other hand, in a state where the ferroelectric block 324 has the second index $n_0$, the surface of the ferroelectric block 324 is provided with a small reflectance. In this case, the general optical parallel communication is carried out.

Figure 43:
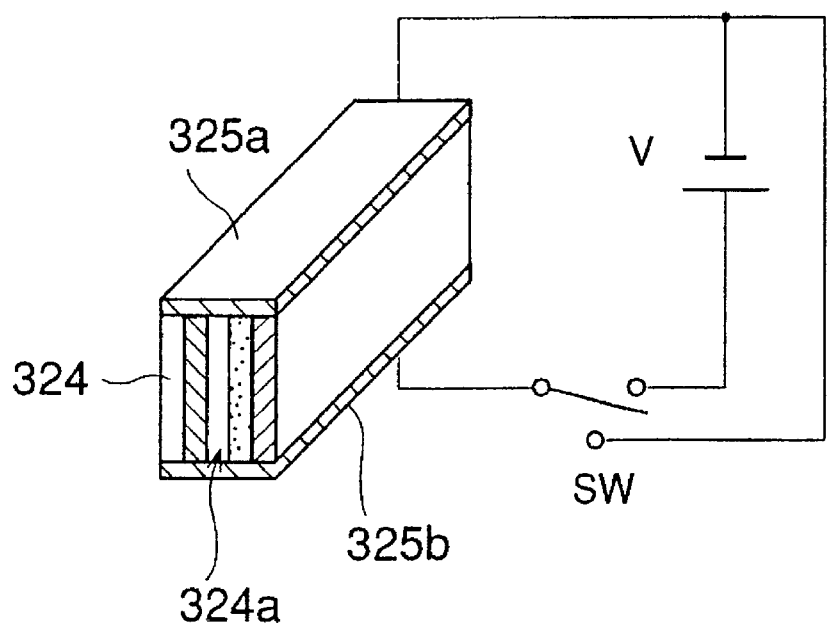
FIG. 43 is a diagram illustrating still another structure of the reflection/transmission control unit.

In a case where sufficient variation of the refractive index on the surface of the ferroelectric block 324 is not obtained, a block in which a multi-layer film 324a is stacked on the ferroelectric block 324 made of $LiNbO_3$ may be sandwiches between the electrodes 325a and 325b, as shown in FIG. 43. The multi-layer film 324a is formed, for example, of layers of $SiO_2$ and $TiO_2$. According to this structure in which the multi-layer film 324a is stacked on the ferroelectric block 324, even if the variation of the refractive index with respect to the applied voltage is small, the variation of the refractive index can be expanded.

Figure 45:
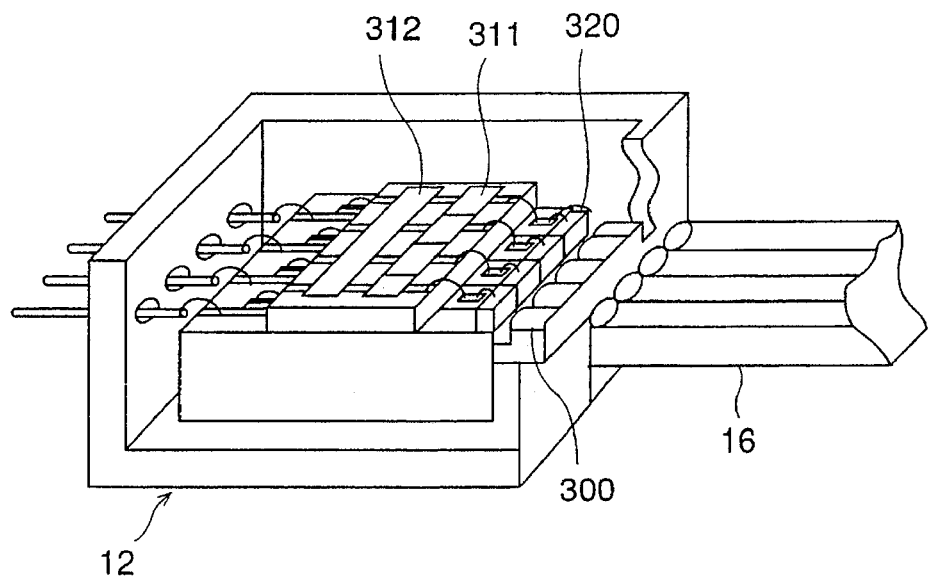
FIG. 45 is a diagram illustrating another structure of the transmission link.

FIG. 45 shows another example of the transmission link 12. In FIG. 45, those parts which are the same as those shown in FIG. 38 are given the same reference numbers.

Figure 46:
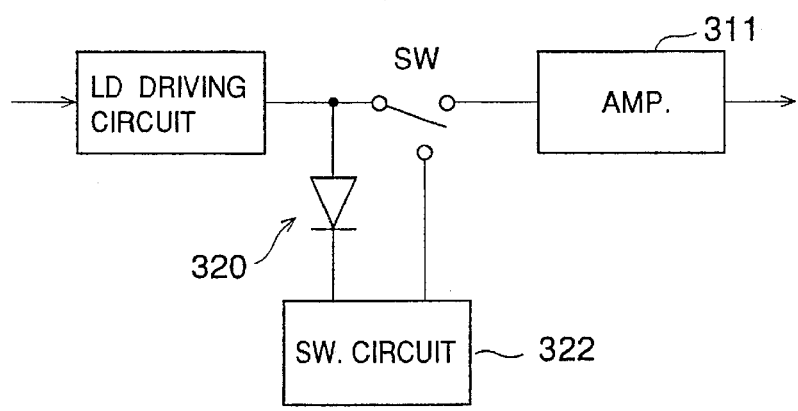
FIG. 46 is a block diagram illustrating a unit for performing a switching operation of an optical unit provided in the transmission link shown in FIG. 45.

In this example, an optical unit 320 into which the laser diode array and the photo-diode array are integrated is used instead of the laser diode array 14 and photo-diode array 310 which are separated. The optical unit 320 is selectively used as the light emission device (the laser diode array) of the photo-detecting device (the photo-diode array) by a switching circuit, as shown in FIG. 46.

Figure 47:
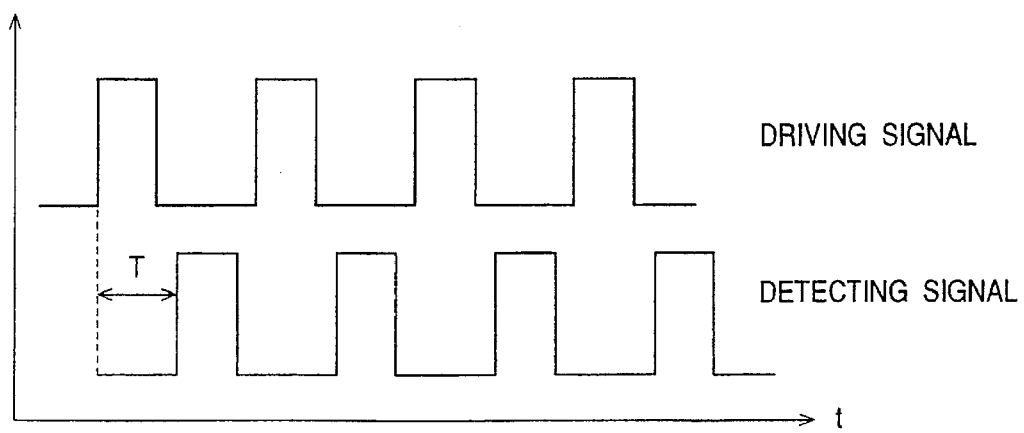
FIG. 47 is a timing chart illustrating a driving signal for a light-emitting device and a detecting signal from photo-detecting device in the optical unit provided in the transmission ling.

The switching circuit alternately switches the driving signal of the laser diode array and detecting signal from the photo-diode array to each other, as shown in FIG. 47. A period T from a time when the driving signal is turned on to a time when the detecting signal is turned on corresponds to a delay time for which the laser beam emitted from the laser diode array is reflected and returned to the optical unit 320. The period T is estimated as follows.

The light velocity Vc in the optical transmission path is equal to $$Vc = 3 \times 10^8 \ m/sec. \times 1/1.5 = 2 \times 10^8 \ m/sec.$$

In a case where the length of the optical fiber is equal, for example, to 100 meters, the above delay time T is estimated as $$T = (100 \times 2)/2 \times 108 = 10-6 \ sec. = 1 \ \mu sec.$$

Thus, in this case, the switching circuit switches the optical unit 320 from the light emission device to the photo-detecting device and vice versa every 1 μsec.

According to the above embodiment, since the optical unit 320 having the functions of both the light emission device (the laser diode) and the photo-detecting device (the photo-diode) in the transmission link 12 is used, the structure of the transmission link 12 can be simplified.

Figure 48:
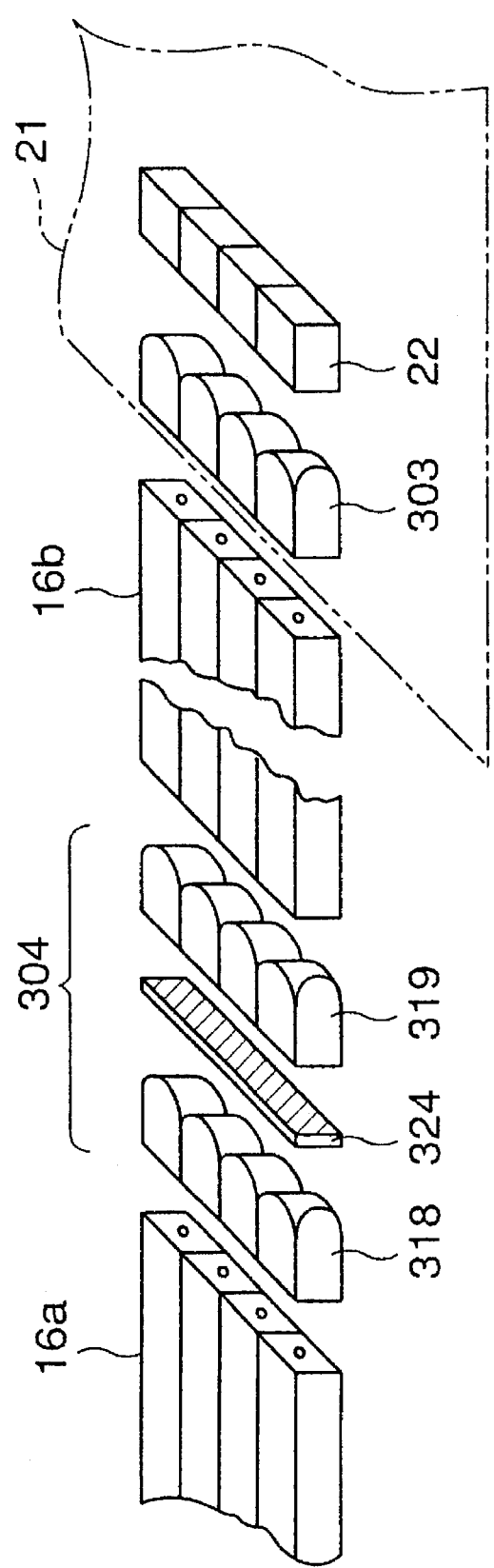
FIG. 48 is a diagram illustrating another example of a structure of the reflection/transmission control unit.

The reflection/transmission control unit 304 for controlling the level of the received signal in the optical parallel transmission system may be formed as shown in FIG. 48.

In general, the optical transmission path is formed of a plurality of fiber arrays coupled to each other. Referring to FIG. 48, the reflection/transmission control unit 304 is provided in a coupling portion at which the fiber array 16a and the fiber array 16b (the connecting portion being closest to the receiving link 21) are coupled. The reflection/transmission control unit 304 has a structure in which the ferroelectric block 324 as shown in FIG. 41 (or the stacked structure of the ferroelectric block 324 and the multi-layer film 324a as shown in FIG. 43) is put between lens arrays 318 and 319.

Figure 49:
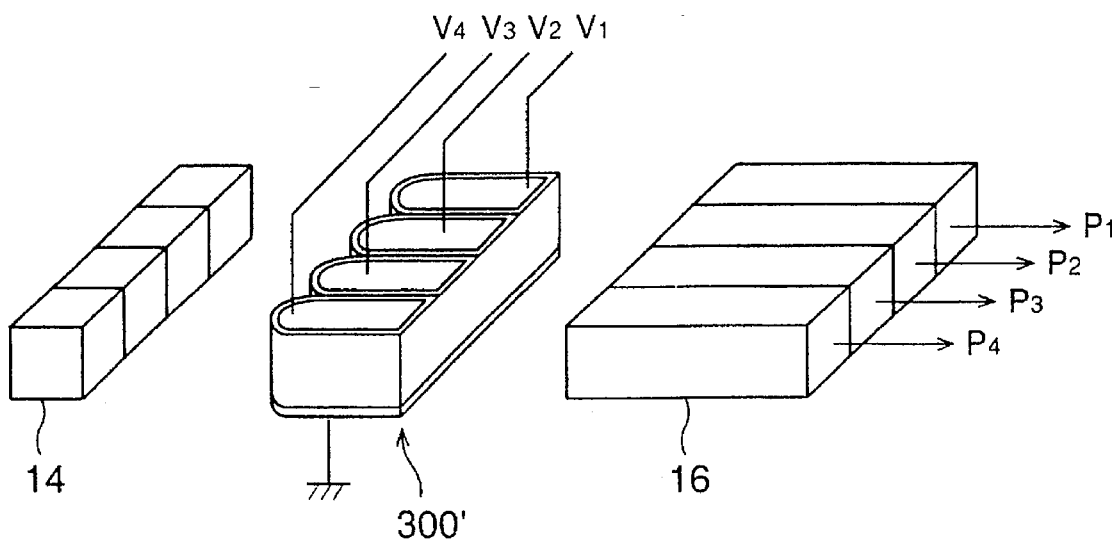
FIG. 49 is a diagram illustrating a system for making received powers in the respective channels uniform in the optical parallel transmission system.

In the next example shown in FIG. 49, the refractive indexes of lenses which are provided in the optical transmission path for the respective channels are controlled, so that the received powers in the respective channels in the receiving link 21 are even.

Figure 50:
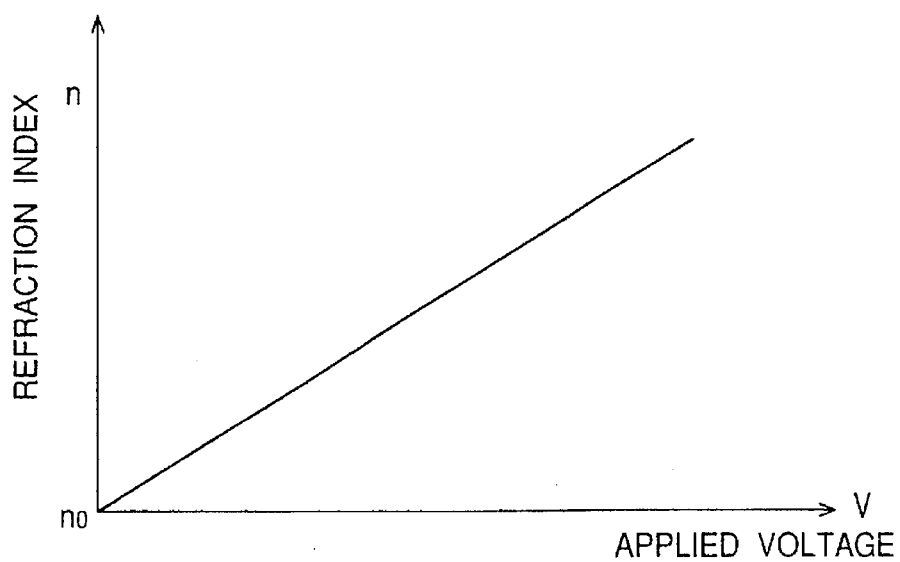
FIG. 50 is a diagram illustrating a relationship between an applied voltage and a refractive index in ferroelectrics forming a lens array.

For example, a lens array 300' is provided between the laser diode array 14 in the transmission link 12 and the fiber array 16. The lens array 300' is sandwiches by a common electrode and control electrodes corresponding to the respective channels. The lens array 300' is formed, for example, of $LiNbO_3$ (lithium niobate). The refractive index of the lens array 300 in each channel is controlled by the applied voltage as shown in FIG. 50.

Figure 51:
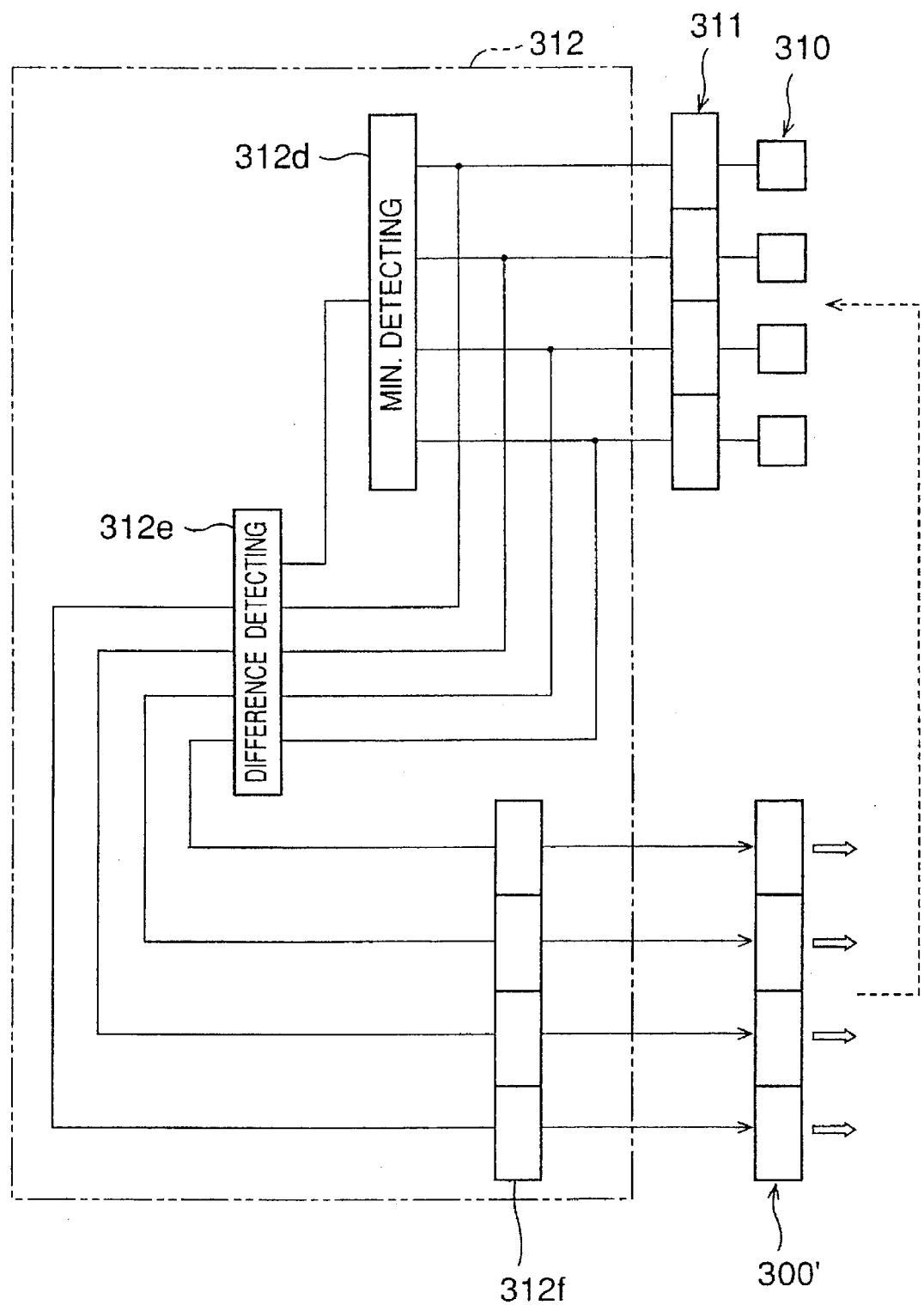
FIG. 51 is a diagram illustrating an operation circuit used with the system shown in FIG. 49.

In this embodiment, the operating circuit 312 is formed, for example, as shown in FIG. 51. Referring to FIG. 51, the operating circuit 312 has a minimum level detecting circuit 312d, a difference detecting circuit 312e and an applied voltage control circuit 312f. The reflected light from the reflection/transmission control unit 304 is incident, as a monitor light, to the photo-diode array 310 via the lens array 300. Monitor output signals from the respective channels of the photo-diode array 310 are supplied to the minimum level detecting circuit 312d via the amplifiers 311. The minimum level detecting circuit 312d detects a lowest level of the monitor signal levels in the respective channels and supplies the lowest level to the difference detecting circuit 312e as a reference level. The difference detecting circuit 312e detects a difference between the monitor signal level in each channel and the reference level (the lowest level). The applied voltage control circuit 312f controls the applied voltage to each channel of the lens array 300' based on the difference supplied from the difference detecting circuit 312e for each channel. As a result, the levels of the monitor light in the respective are unified so as to be controlled at the same level corresponding to the reference level.

Figure 52A:
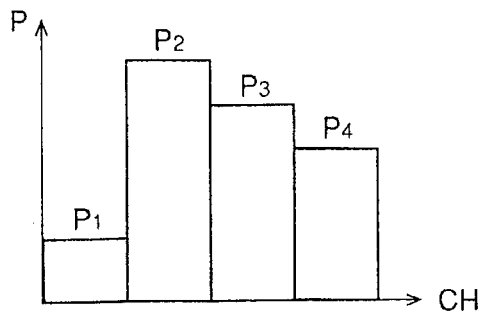
FIG. 52A is a diagram illustrating received powers in the respective channels.
Figure 52B:
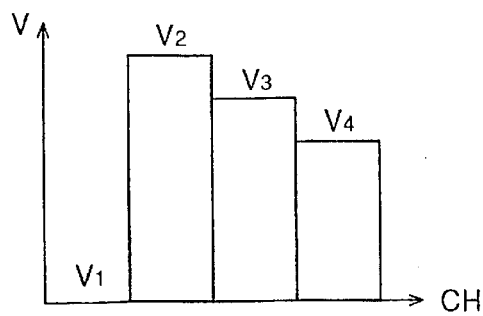
FIG. 52B is a diagram illustrating applied voltages to the lens array in the respective channels.
Figure 52C:
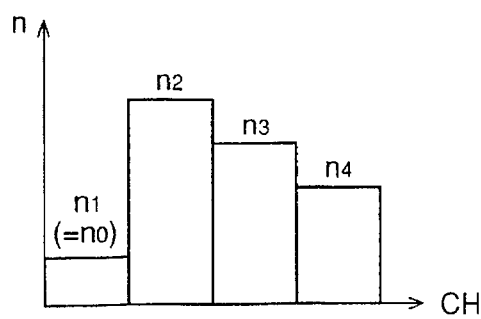
FIG. 52C is a diagram illustrating refractive indexes of ferroelectrics in the respective channels.

In a case where the levels (powers) of the monitor light in the respective channels are $P_1$, $P_2$, $P_3$ and $P_4$ as shown in FIG. 52A, the minimum level $P_1$ is used as the reference level. The applied voltages for the respective channels are controlled based on the differences $(P_1-P_1)$, $(P_2-P_1)$, $(P_3-P_1)$ and $(P_4-P_1)$. That is, voltages V1 (the reference), V2, V3 and V4 corresponding to the references are applied to the respective channels of the lens array 300', as shown in FIG. 52B. As a result the refractive indexes of the respective channels in the lens array 300' are controlled to n2, n3, n4 and n1 as shown in FIG. 52C. The greater the level of the monitor light the greater the refractive index of the lens array 300'.

Figure 52D:
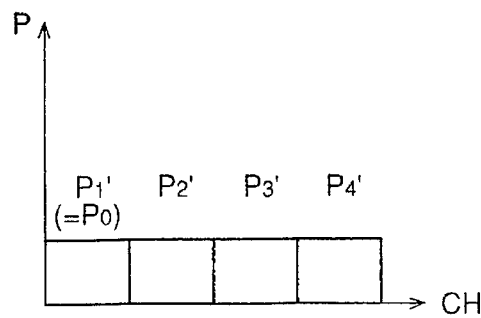
FIG. 52D is a diagram illustrating controlled powers in the respective channels.
Figure 53A:
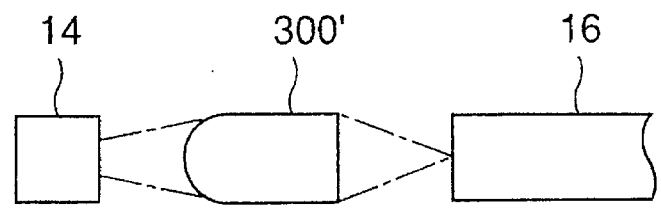
FIG. 53A is a diagram illustrating a focused position of a laser beam which has passed through the lens array in which the refractive index is controlled so that a large power is obtained.
Figure 53B:
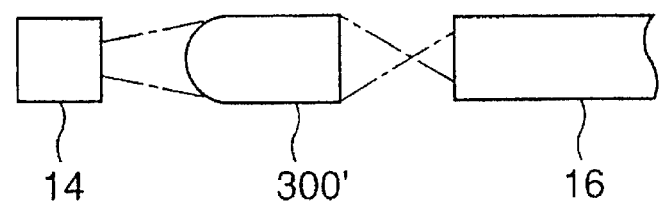
FIG. 53B is a diagram illustrating a focused position of a laser beam which has passed through the lens array in which the refractive index is controlled so that a small power is obtained.

For example, in a case where the refractive index of the lens array 300' is controlled so that laser beam from the laser diode array 14 is focused on an end surface of the fiber array 16 as shown in FIG. 53A, the monitor light has a high level (a high power). When the refractive index of the lens array 300' is increased, the laser beam is focused on a plane in front of the end surface of the fiber array 16. Thus, the monitor light has a low level (a low power). When the refractive indexes of the respective channels of the lens array 300' are controlled in accordance with a processes as shown in FIGS. 52A, 52B and 52C, the powers of the received signals in the respective channels are unified, as shown in FIG. 52D.

According to the present embodiment, the levels of the received signal in the respective channels can be unified without direct control of the driving currents of the laser diode array.

Figure 54:
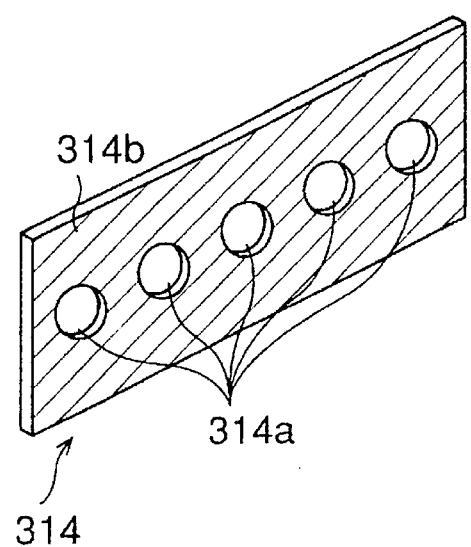
FIG. 54 is a diagram illustrating another example of the reflection/transmission plate used in the reflection/transmission control unit.

The reflection/transmission plate 314 used in the reflection/transmission control unit 304 as shown in FIG. 40 may be formed as shown in FIG. 54. Referring to FIG. 54, transmission portions 314a corresponding to the respective channels are arranged on a center line of the reflection/ transmission plate 314. In this case, the reflection/ transmission plate 314 may be moved in a horizontal direction or in a vertical direction. The moving distance can be small.

The present invention is not limited to the aforementioned embodiments, and variations and modifications may be made in the scope of the claimed invention.

What is claimed is:

1. A data decision circuit used in an optical parallel receiving module in an optical parallel transmission system in which optical signals corresponding to data in a plurality of channels are transmitted using fibers in parallel, said optical parallel receiving module converting the optical signals into received signals which are electric signals and generating received data in periods based on a predetermined threshold level of the received signals, said data decision circuit recognizing data in a channel at a predetermined timing in every said period of the received data, said data decision circuit comprising:

data edge position detecting means for detecting in which region of a plurality of regions a rising edge of the received data is and for outputting a detecting signal corresponding to a detected region, one period of the received data having a reference phase equal to a phase of a reference clock signal being divided into the plurality of regions; and data acquisition means to which a plurality of clocks having different phases and the detecting signal from said data edge position detecting means are supplied, each of said plurality of clocks corresponding to one of said plurality of regions, for acquiring said data at a timing of one said clock corresponding to a region in which the rising edge of the received data is detected by the data edge position detecting means.

2. The data decision circuit as claimed in claim 1 further comprising:

multi-phase clock generating means for generating said plurality of clocks based on a reference clock.

3. The data decision circuit as claimed in claim 2, wherein said data edge position detecting means detects in which region of four regions a rising edge of the received data is, the four regions including a first region from a start time "0" of a period T of the reference clock to a time "τ" which is in a range between a width of a one-sided range of a period of the received data in which eye opening is deteriorated and a time "T/4", a second region from the time "τ" to a time "T/2", a third region from a time "T/2" to a time "(T/2+τ)" and a fourth region from the time "(T/2+τ)" to a time "T", wherein said multi-phase clock generating means generates a first clock corresponding to the first region, a second clock corresponding to the second region, a third clock corresponding to the third region and a fourth clock corresponding to the fourth region, the first clock having a first timing edge between the second region and third region, the second clock having a second timing edge between the third region and the fourth region, the third clock having a third timing edge between the fourth region and the first region, the fourth clock having a fourth timing edge between the first region and the second region, and wherein data acquisition means acquires said data at said timing edge of one of the first, the second, the third and the fourth clocks corresponding to one of the first, second, third and fourth regions in which the rising edge of the received data is detected.

4. The data decision circuit as claimed in claim 3, wherein said multi-phase clock generating means has a clock generating circuit for generating a twice clock having a frequency twice as large as a frequency of the reference clock, a first toggle flip flop to which the twice clock is supplied, an inverter circuit to which the twice clock and a second toggle flip flop to which an output signal of said inverter circuit, said multi-phase clock generating means generating the first clock and the third clock based on an output signal of said first toggle flip flop and generating the second clock and the fourth clock based on an output signal of said second toggle flip flop, the first clock having a phase equal to a phase of the reference clock, the third clock having a phase which is delayed by T/2 from the clock, the second clock having a phase which is delayed by T/4 from the reference clock and the fourth clock having a phase which is advanced by T/4 from the reference clock.

5. The data decision circuit as claimed in claim 3, wherein said data edge position detecting means has a first flip flop having a clock input terminal to which the received data is supplied and a data input terminal to which the first clock or the third clock is supplied and a second flip flop having a clock input terminal to which the received data is supplied and a data input terminal to which the second clock or the fourth clock is supplied, said data edge position detecting means generating the detecting signal including an output signal of said first flip flop and an output signal of said second flip flop, the detecting signal specifying the region in which the rising edge of the received data is, based on levels of the output signals of said first flip flop and said second flip flop.

6. An optical parallel receiving module comprising:

a photo-diode array connecting an array optical fiber;

an analog integrated circuit in which pre-amplifiers for amplifying output signals of said photo-diode array, and comparing circuits for comparing output signals of said pre-amplifiers and a fixed threshold level, are integrated as a monolithic integrated circuit; and a digital integrated circuit including data decision circuits each for receiving output signals of said analog integrated circuit and integrating said output signals as a monolithic integrated circuit, wherein said photo-diode array, said analog integrated circuit and said digital integrated circuit are formed in a single base, each data decision circuit including:

data edge position detecting means for detecting in which region of a plurality of regions a rising edge of received data is and for outputting a detecting signal corresponding to a detected region, one period of the received data having a reference phase equal to a phase of a reference clock signal being divided into the plurality of regions; and data acquisition means to which a plurality of clocks having different phases and the detecting signal from said data edge position detecting means are supplied, each of said plurality of clocks corresponding to one of said plurality of regions, for acquiring data at a timing of a clock corresponding to the region of said plurality of regions in which the rising edge of the received data is detected by the data edge position detecting means.

7. An optical parallel receiving module comprising:

photo-diode array for receiving, as optical received signals, data which is coded in mB1c in a plurality of channels, the data being transmitted from a transmission link in an optical parallel transmission system;

pre-amplifiers for amplifying output signals of said photo-diode array;

comparing circuits for comparing output signals of said pre-amplifiers and a fixed threshold level;

data decision circuits for detecting rising edges in said received data;

C-bit synchronizing circuits for detecting C-bits in output signals of said data decision circuits; and C-bit correction circuit for making phases of said detected C-bits in the respective channels even, based on output signals of said C-bit synchronizing circuits, a C-bit being a complementary code added at fixed intervals of said data.

8. An optical parallel receiving module which receives optical signals transmitted in parallel in a plurality of channels by using optical fibers, said optical parallel receiving module comprising:

photo-electric conversion means for converting received optical signals to electric signals as received signals;

comparing means for comparing the received signals and a threshold level; and data recognition means for recognizing data at a timing of said received data using a reference clock, said data recognition means having data edge position detecting means for detecting in which region of a plurality of regions a rising edge of the received data is, and for outputting a detecting signal corresponding to a detected region, one period of the received data having a reference phase equal to a phase of the reference clock signal being divided into the plurality of regions; and data acquisition means to which a plurality of clocks having different phases and the detecting signal from said data edge position detecting means are supplied, each of said plurality of clocks corresponding to one of said plurality of regions, for acquiring data at a timing of a clock corresponding to a region in which the rising edge of the received data is detected by the data edge position detecting means.

9. An optical parallel receiving module having a plurality of data channels, in each said channel a received data signal is generated as an electric signal from an optical signal corresponding to data transmitted through an optical path and received data is then generated based on the received data signal, and said receiving module having a clock channel in which a received clock signal is generated as an electric signal from an optical signal corresponding to a clock and a received clock is generated based on the received clock signal, data being recognized from the received data in each data channel at a timing specified by the received clock in the clock channel, said optical parallel receiving module comprising:

receiving data generating means for generating the received data from the received data signal in each data channel with reference to a fixed threshold level;

threshold generating means for generating a clock threshold level based on the received clock signal in the clock channel; and clock generating means for generating the received clock from the received clock signal in the clock channel with reference to the clock threshold level generated by said threshold generating means.

10. The optical parallel receiving module as claimed in claim 9, wherein said threshold generating means has means for generating said clock threshold level corresponding to an average level of the received signal in the clock channel.

11. The optical parallel receiving module as claimed in claim 9, wherein said plurality of data channels and the clock channel are formed in a monolithic integrated circuit, said clock channel being located at an end portion of a chip on which the monolithic integrated circuit is formed.

12. The optical parallel receiving module as claimed in claim 11, wherein at least a part of said threshold generating means is provided outside of said chip on which said monolithic integrated circuit is formed.

13. An optical parallel receiving module having a plurality of data channels, in each said channel a received data signal is generated as an electric signal from an optical signal corresponding to data transmitted through an optical path and received data is then generated based on the received data signal, and said receiving module having a clock channel in which a received clock signal, is generated as an electric signal from an optical signal corresponding to a clock and a received clock is generated based on the received clock signal, data being recognized from the received data in each data channel at a timing specified by the received clock in the clock channel, said optical parallel receiving module comprising:

threshold generating means for generating a threshold level based on the received clock signal in the clock channel;

received data generating means for generating the received data from the received data signal in each data channel with reference to the threshold level generated by said threshold generating means; and clock generating means for generating the received clock from the received clock signal in the clock channel with reference to the threshold level generated by said threshold generating means.

14. The optical parallel receiving module as claimed in claim 13, wherein said threshold generating means has means for generating said threshold level corresponding to an average level of the received signal in the clock channel.

15. The optical parallel receiving module as claimed in claim 14, wherein said means for generating the threshold level corresponding to the average level of the received signal in the clock channel comprises:

average level detecting means for detecting the average level of the received signal in the clock channel; and operating means for multiplying the average level detected by said average level detecting means and a constant which is decided based on distortion of the received signal and is less than 1, a result obtained by said operating means being used as the threshold level.

16. The optical parallel receiving module as claimed in claim 15, wherein the constant used in said operating means is decided in accordance with a formula $$2\sqrt{\chi(1-\chi)}$$

where $\chi$ is a ratio of the distortion to the received signal.

17. The optical parallel receiving module as claimed in claim 15, wherein said plurality of data channels and the clock channel are formed in a monolithic integrated circuit, the clock channel being located at an end portion of a chip on which the monolithic integrated circuit, at least a part of said average detecting means being provided in an outside of said chip.

18. Th optical parallel receiving module as claimed in claim 13, wherein said threshold generating means comprises:

first means for generating a threshold level corresponding to an average level of the received clock signal in the clock channel;

second means for outputting a fixed threshold level which is estimated as a level less than a lowest level of levels of the received data signals in the respective data channels; and selecting means for supplying as a greater one of the threshold level generated by said first means and the fixed threshold level generated by said second means to said received data generating means in the respective data channels and the clock generating means in the clock channel.

19. The optical parallel receiving module as claimed in claim 18, said first means comprises:

average level detecting means for detecting the average level of the received signal in the clock channel; and operating means for multiplying the average level detected by said average level detecting means and a constant which is decided based on distortion of the received signal and less than 1, said first means outputting a result obtained by said operation mean as the threshold level.

20. The optical parallel receiving module as claimed in claim 19, the constant used in said operating means is decided in accordance with a formula $$2\sqrt{\chi(1-\chi)}$$

where $\chi$ is a ratio of the distortion to the received signal.

21. The optical parallel receiving module as claimed in claim 18, wherein the fixed threshold level output from said second means has a level which is 50% of the lowest level of levels of received data signals in the respective channels.

* * * * *